(12) United States Patent  
Hashimoto

(10) Patent No.: US 8,189,163 B2
(45) Date of Patent: May 29, 2012

(54) DISPLAY DEVICE

(75) Inventor: Yoshiaki Hashimoto, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 256 days.

(21) Appl. No.: 12/616,889

(22) Filed: Nov. 12, 2009

(65) Prior Publication Data

US 2010/0118255 A1   May 13, 2010

(30) Foreign Application Priority Data

Nov. 11, 2008   (JP) .................................. 2008-288401

(51) Int. Cl.
*G02F 1/1339* (2006.01)
(52) U.S. Cl. ...................................................... 349/155
(58) Field of Classification Search ........... 349/155–157
See application file for complete search history.

(56) References Cited

U.S. PATENT DOCUMENTS

| | | | |
|---|---|---|---|
| 6,774,974 B1 * | 8/2004 | Matsuyama ................... | 349/155 |
| 7,345,732 B2 * | 3/2008 | Liu et al. ........................ | 349/156 |
| 7,911,578 B2 * | 3/2011 | Matsuoka et al. ............ | 349/156 |
| 2004/0135959 A1 * | 7/2004 | Choi .............................. | 349/155 |
| 2006/0033876 A1 * | 2/2006 | Park et al. ..................... | 349/155 |
| 2007/0188695 A1 * | 8/2007 | Wu et al. ....................... | 349/156 |
| 2010/0118254 A1 * | 5/2010 | Hashimoto ................... | 349/155 |

FOREIGN PATENT DOCUMENTS

| | | |
|---|---|---|
| JP | 2000-267111 | 9/2000 |
| JP | 2001-117103 | 4/2001 |
| JP | 2005-242297 | 9/2005 |

* cited by examiner

*Primary Examiner* — Eric Wong
(74) *Attorney, Agent, or Firm* — Young & Thompson

(57) ABSTRACT

Disclosed is a display device including a first substrate and a second substrate bonded to the first substrate. The first substrate includes a first surface and a second surface, on which a columnar spacer is formed. The second substrate includes a third surface, on which a columnar spacer facing portion is formed, and a fourth surface. The second surface is opposed to the third surface, and at least one of a top portion of the columnar spacer and the columnar spacer facing portion has an inclined surface, which is inclined relative to the second surface or the third surface. An inclination direction of the inclined surface, when viewed from a normal direction of the first surface or the fourth surface, is parallel to or perpendicular to a first direction, which is parallel to the first surface or the fourth surface.

9 Claims, 25 Drawing Sheets

INCLINATION DIRECTION OF INCLINED
SURFACE OF COLUMNAR SPACER

INCLINATION DIRECTION OF INCLINED
SURFACE OF COLUMNAR SPACER

INCLINATION DIRECTION OF INCLINED
SURFACE OF COLUMNAR SPACER

DIRECTION OF ABSORPTION
AXIS OF CF SUBSTRATE
SIDE POLARIZER

INCLINATION DIRECTION OF INCLINED
SURFACE OF COLUMNAR SPACER

DIRECTION OF ABSORPTION
AXIS OF CF SUBSTRATE
SIDE POLARIZER

INCLINATION DIRECTION OF INCLINED
SURFACE OF COLUMNAR SPACER

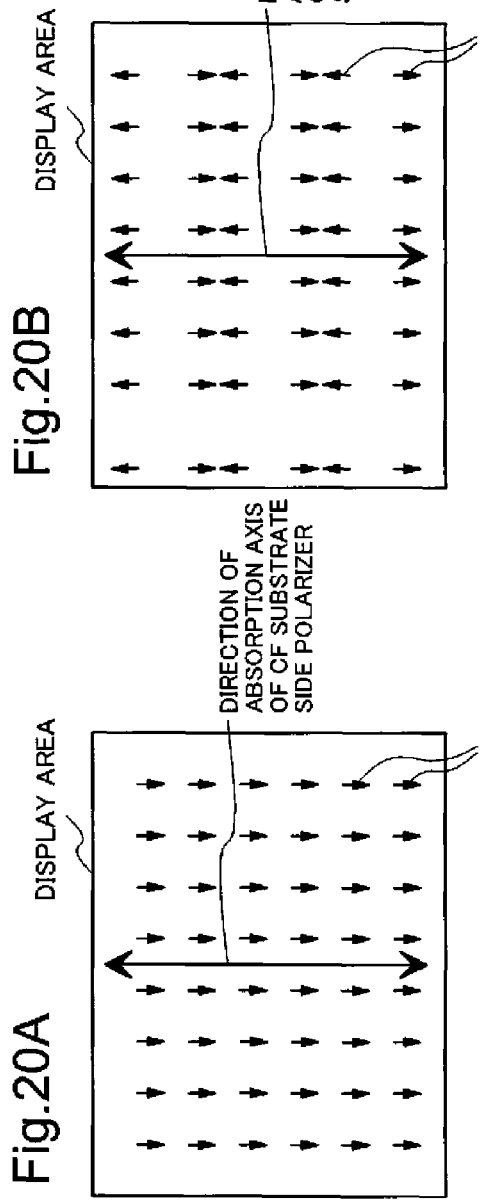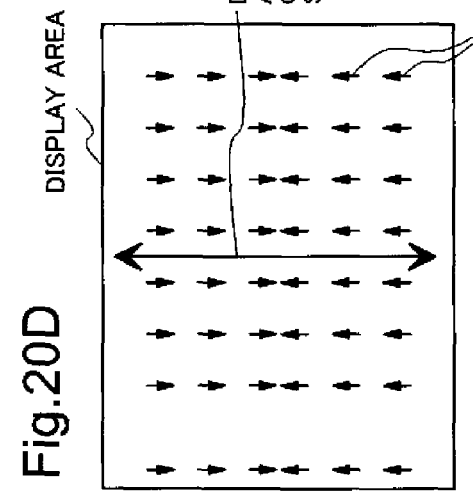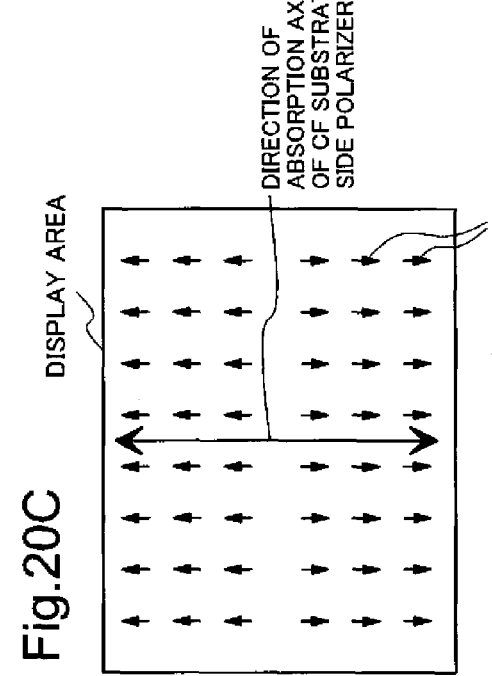

DISPLAY DEVICE

This application is based upon and claims the benefit of priority from Japanese Patent Application No. 2008-288401, filed on Nov. 11, 2008, the disclosure of which is incorporated herein in its entirety by reference.

TECHNICAL FIELD

The present invention relates to a display device and in particular, relates to a liquid crystal display device in which a cell gap between a pair of substrates is defined by a spacer between the substrates.

BACKGROUND ART

A liquid crystal display panel has a spherical spacer or a columnar spacer between a TFT (Thin Film Transistor) substrate and a CF (Color Filter) substrate. The liquid crystal display panel has a structure in which these substrates are bonded together while sandwiching the spacer between the substrates. A predetermined cell gap between the substrates is defined by the spacer.

The spherical spacer moves in a space between the substrates easily. In order to prevent the movement, a fixing layer may be provided on a surface of the spherical spacer. The fixing layer of the spherical spacer usually has only a fixing strength with which the movement and the separation of the spherical spacer caused by a turn-over of the substrate or the like can be avoided. The spherical spacer easily moves by a surface contact when performing a rubbing process or the like. For this reason, in the liquid crystal display device in which the cell gap is formed by using a spherical spacer material, the spherical spacer easily moves by vibration during transportation or the like, because the fixing strength of the spherical spacer is low. In this liquid crystal display device, a display defect such as a light leak, a reduction in contrast, a cell gap unevenness or the like is generated by the movement of the spherical spacer. An abnormal alignment occurs around the spherical spacer arranged in a display area. This causes a reduction in contrast in the display area.

Moreover, in a liquid crystal display panel, in which a high-speed response so as to handle a moving picture or the like, the high-speed response is realized by, for example, a small cell gap. However, in order to make the cell gap small, a particle diameter of the spherical spacer has to be small. Production of such a spherical spacer, with small particle diameter and small variation in particle size is quite difficult.

In contrast, the columnar spacer is fixed to one of the substrates unlike the spherical spacer. In a liquid crystal display device in which the columnar spacer is arranged in a light shielding portion, the columnar spacer is firmly fixed to one of the substrates, such as a CF substrate or the like. Therefore, a problem such as the movement of the spacer caused by vibration or the like does not occur. Moreover, because the columnar spacer is arranged in the light shielding portion, a contrast of the liquid crystal display panel is improved. The columnar spacer is smaller than the spherical spacer and a height of the columnar spacer has a small variation.

In recent years, according to demand of a liquid crystal display device having a high contrast ratio and a high speed response increases, a liquid crystal display device, in which the columnar spacer is arranged in the light shielding portion is largely produced.

The columnar spacer is fixed to one of the substrates unlike the spherical spacer. When an external stress, by rubbing a panel surface or the like is applied, the columnar spacer fixed to one of the substrates slides on the surface of the other opposed substrate. For this reason, a residual stress is generated in a substrate material by a frictional force between a top of the columnar spacer and a columnar spacer facing portion of the other substrate.

The cell gap is generally formed in a state in which the columnar spacer is compressed by several percents. A force is applied between the surface of the columnar spacer and the surface of the substrate which always contacts with the columnar spacer. Therefore, even if the force applied from outside is released, the state does not easily return to the original state because of a friction between the columnar spacer and the surface of the substrate, which contacts with the columnar spacer.

A material having small retardation, such as a glass, is generally used as a transparent substrate of a liquid crystal display device. In the panel in the above-mentioned state, the retardation is generated by the residual stress generated on a glass substrate that is caused by the friction between the columnar spacer and the glass substrate mentioned above. In an area where the retardation is generated, a light leakage occurs in a black-color display screen. When black color luminance is increased by the light leakage, the contrast is decreased and uniformity of black image quality is decreased.

When the panel is fixed by pushing an outer periphery of the panel with a module chassis or the panel is directly fixed to a module member with a double-stick tape, a stress is locally applied on the panel if the panel or the module member itself has deformation such as distortion, warpage, or the like. In such state, the retardation is generated by the residual stress of the glass substrate and the light leakage defect is generated as in the above-mentioned case.

A relation between the retardation generated by the residual stress of the glass substrate and the light leakage mentioned above will be described with reference to FIGS. 23A and 23B.

FIG. 23A shows an actual distribution of the light leakage in the panel when a load is applied to a central portion of the panel using an IPS (In Plane Switching) method. FIG. 23B shows the distribution of the light leakage predicted based on the measurement result of a magnitude and a direction of the residual stress of the panel using the IPS method.

An intensity of a light emitted by the retardation of a glass is proportional to $\sin(2\theta)$, where $\theta$ is an angle between a direction of an absorption axis of a polarizer and a direction in which the residual stress is generated. Namely, as shown in the following equation, a predicted value of emission light intensity is proportional to a product of the magnitude of the residual stress and $\sin(2\theta)$.

$$I = A\tau \sin(2\theta) \qquad \text{[equation 1]},$$

where I is the emission light intensity, $\tau$ is the magnitude of the residual stress, $\theta$ is the angle between the direction of the absorption axis of the polarizer and the direction of the residual stress, and A is a constant irrelevant to $\tau$ or $\theta$.

A good match between the predicted value shown in FIG. 23B and the actually measured value shown in FIG. 23A is obtained. In the both distributions, as the angle between the direction of the residual stress and the direction of the absorption axis of a CF substrate side polarizer approaches 45 degrees, the light leakage becomes maximum. It can be seen that the retardation generated on the glass substrate causes the light leakage defect in the black-color display screen.

In a portion which is contact with the columnar spacer, the same phenomenon as mentioned above occurs. The direction of the residual stress generated on the glass substrate relates to the light leakage in the black-color display screen.

A liquid crystal display device described in Japanese Patent Application Laid-Open No. 2001-117103 comprises the columnar spacer. FIG. 26 shows a structure of the liquid crystal display device disclosed by Japanese Patent Application Laid-Open No. 2001-117103. In this liquid crystal display device, a columnar spacer 11 is fixed on a CF substrate 13 so as to face a TFT substrate 16. The area of the columnar spacer 11 occupies 0.05 to 0.15 percent of a pixel area of a display area. According to this area ratio, uniformity of the cell gap between the TFT substrate 16 and the CF substrate 13 is maintained, and nonuniformity of gravity, in which a liquid crystal collects in a lower portion as a temperature of a liquid crystal display panel rises, is suppressed.

In a liquid crystal display device described in Japanese Patent Application Laid-Open No. 2005-242297, a convex step is formed at a position corresponding to the columnar spacer. FIG. 27 shows a structure of a liquid crystal display device disclosed by Japanese Patent Application Laid-Open No. 2005-242297. A step 21 reduces a frictional force of a columnar spacer 20a and suppresses occurrence of display failure caused by temperature rise of the liquid crystal display panel.

In a liquid crystal display device described in Japanese Patent Application Laid-Open No. 2000-267111, the columnar spacer is formed so that the columnar spacers are faced each other. FIG. 28 shows a structure of the liquid crystal display device disclosed by Japanese Patent Application Laid-Open No. 2000-267111. The columnar spacer 33 fixed on one substrate 31 has an inclined surface which matches the inclined surface of a columnar spacer 34 that is fixed at a position opposed to the columnar spacer 33 on an counter substrate 32. When a volume of a liquid crystal is decreased with temperature decrease, a distance between two substrates varies according to a slide between the columnar spacers. As a result, an occurrence of a vacuum bubble is suppressed and a display failure is prevented.

SUMMARY

An exemplary object of the invention is to provide a storage apparatus, a display device, a substrate, and a method for manufacturing the substrate, which may resolve the problem of deterioration in performance.

An object of the present invention is to provide a high-quality liquid crystal display device in which the light leakage defect caused by the retardation of the substrate is less likely to occur.

A display device according to the present invention includes a first substrate and a second substrate which is bonded to the first substrate. The first substrate includes a first surface and a second surface on which the columnar spacer is formed. The second substrate includes a third surface on which a columnar spacer facing portion is formed and a fourth surface. The second surface is opposed to the third surface. At least one of a top of the columnar spacer and the columnar spacer facing portion has the inclined surface which is inclined relative to the second surface or the third surface. When viewed from a normal direction of the first surface or the fourth surface, an inclination direction of the inclined surface is parallel to or perpendicular to the first direction parallel to the first surface or the fourth surface.

A display device according to the present invention includes a first substrate and a second substrate bonded to the first substrate. The first substrate includes a first surface and a second surface, on which a columnar spacer is formed. The second substrate includes a third surface, on which a columnar spacer facing portion is formed, and a fourth surface. The second surface is opposed to the third surface, and at least one of a top portion of the columnar spacer and the columnar spacer facing portion has an inclined surface, which is inclined relative to the second surface or the third surface. An inclination direction of the inclined surface, when viewed from a normal direction of the first surface or the fourth surface, is parallel to or perpendicular to a first direction, which is parallel to the first surface or the fourth surface.

A substrate, which is bonded to a counter substrate, while sandwiching a liquid crystal between the substrate and the counter substrate, according to the present invention, includes a first polarizer arranged on a first surface and a columnar spacer formed on a second surface. A top portion of the columnar spacer has an inclined surface, which is inclined relative to the second surface. A direction of an absorption axis of the first polarizer or a direction of an absorption axis of a second polarizer arranged in the counter substrate is parallel to or perpendicular to an inclination direction of the inclined surface, when viewed from a normal direction of the first surface.

A method for manufacturing a substrate, which is bonded to a counter substrate, while sandwiching a liquid crystal between the substrate and the counter substrate, according to the present invention includes forming a columnar spacer on a first surface of the substrate, so that a top portion of the columnar spacer has an inclined surface, which is inclined relative to the first surface, and forming a first polarizer on a second surface of the substrate. A direction of an absorption axis of the first polarizer or a direction of an absorption axis of a second polarizer arranged in the counter substrate is parallel to or perpendicular to an inclination direction of the inclined surface, when viewed from a normal direction of the first surface.

BRIEF DESCRIPTION OF THE DRAWINGS

Exemplary features and advantages of the present invention will become apparent from the following detailed description when taken with the accompanying drawings in which:

FIGS. 20A to 20D show an inclination direction of a columnar spacer in a liquid crystal display panel according to a second embodiment and a tenth to a twelfth embodiments, respectively;

EXEMPLARY EMBODIMENT

Next, a-detailed explanation will be given for a first exemplary embodiment with reference to the drawings.

Embodiment 1

Figure 1:
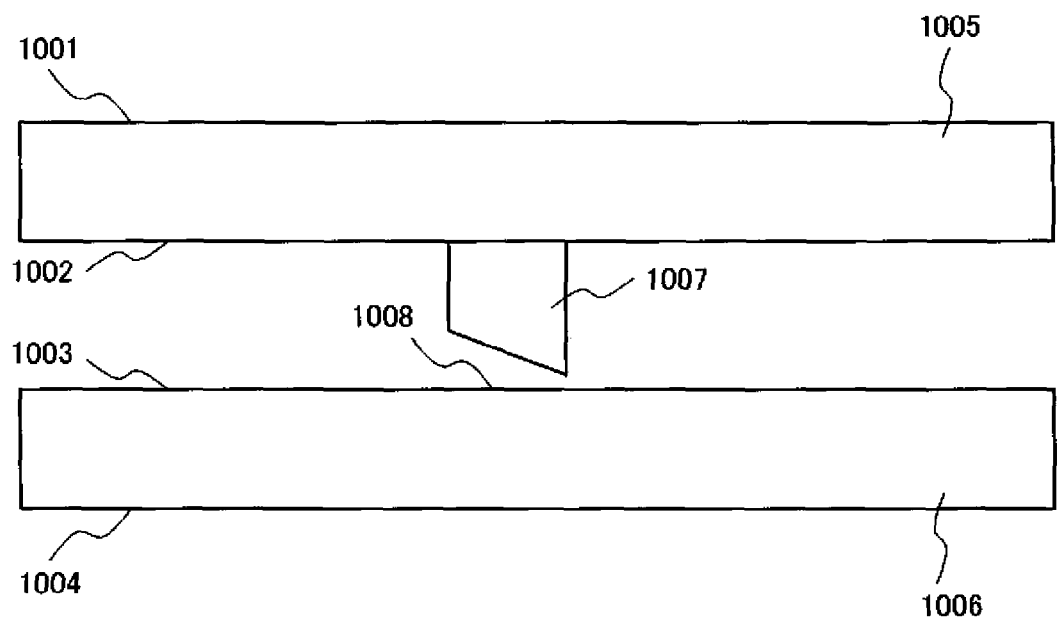
FIG. 1 is a sectional view showing a structure of a liquid crystal display panel according to a first embodiment of the present invention.

The above-mentioned embodiment of the present invention will be described more in detail. A display device according to a first embodiment of the present invention will be described with reference to FIG. 1. FIG. 1 is a sectional view showing a structure of the display panel.

As shown in FIG. 1, the display device of this embodiment includes a first substrate 1005 having a first surface 1001 and a second surface 1002 and a second substrate 1006 having a third surface 1003 and a fourth surface 1004. A columnar spacer 1007 is formed on the second surface 1002 of the first substrate 1005. A columnar spacer facing portion 1008 is formed at a position corresponding to the columnar spacer on the third surface 1003 of the second substrate. A top of the columnar spacer 1007 has an inclined surface.

The inclination direction of the inclined surface of the top of the columnar spacer 1007 of this embodiment is parallel to a first direction parallel to the first surface or the fourth surface when viewed from a normal direction of the first surface or the fourth surface.

The direction of the residual stress generated to the substrate becomes substantially parallel to or perpendicular to the first direction specified as mentioned above by the columnar spacer.

The occurrence of light leakage can be controlled by controlling the direction of the residual stress as mentioned above.

For this reason, when a stress is applied to a display device from the outside, the direction of the residual stress of the substrate is controlled by the inclination of the top of the columnar spacer. The light leakage caused by the retardation of the substrate can be suppressed by properly selecting the first direction mentioned above.

Embodiment 2

Figure 2:
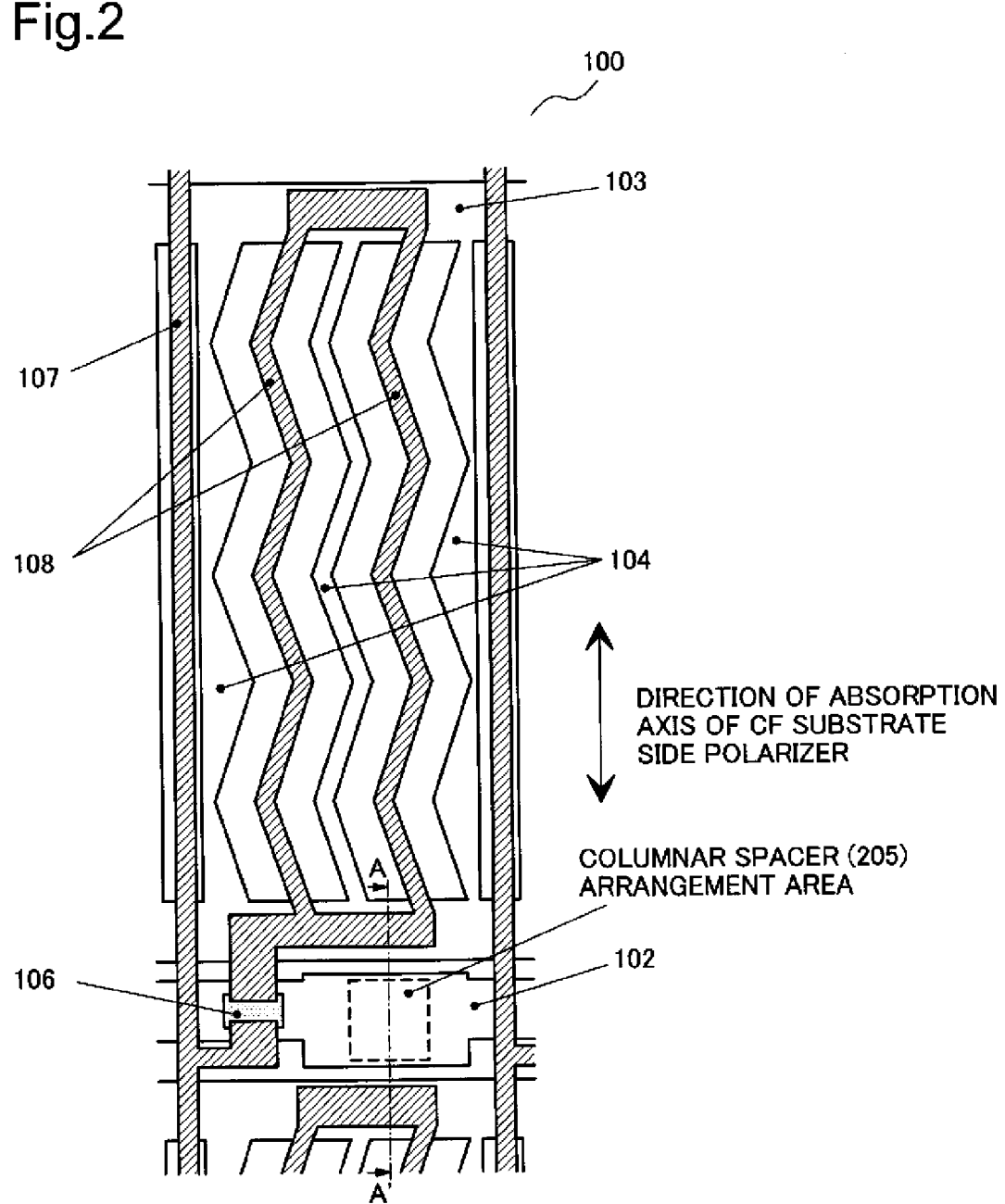
FIG. 2 is a plan view showing a structure of one pixel of a TFT substrate of a liquid crystal display panel according to a second embodiment of the present invention.
Figure 3:
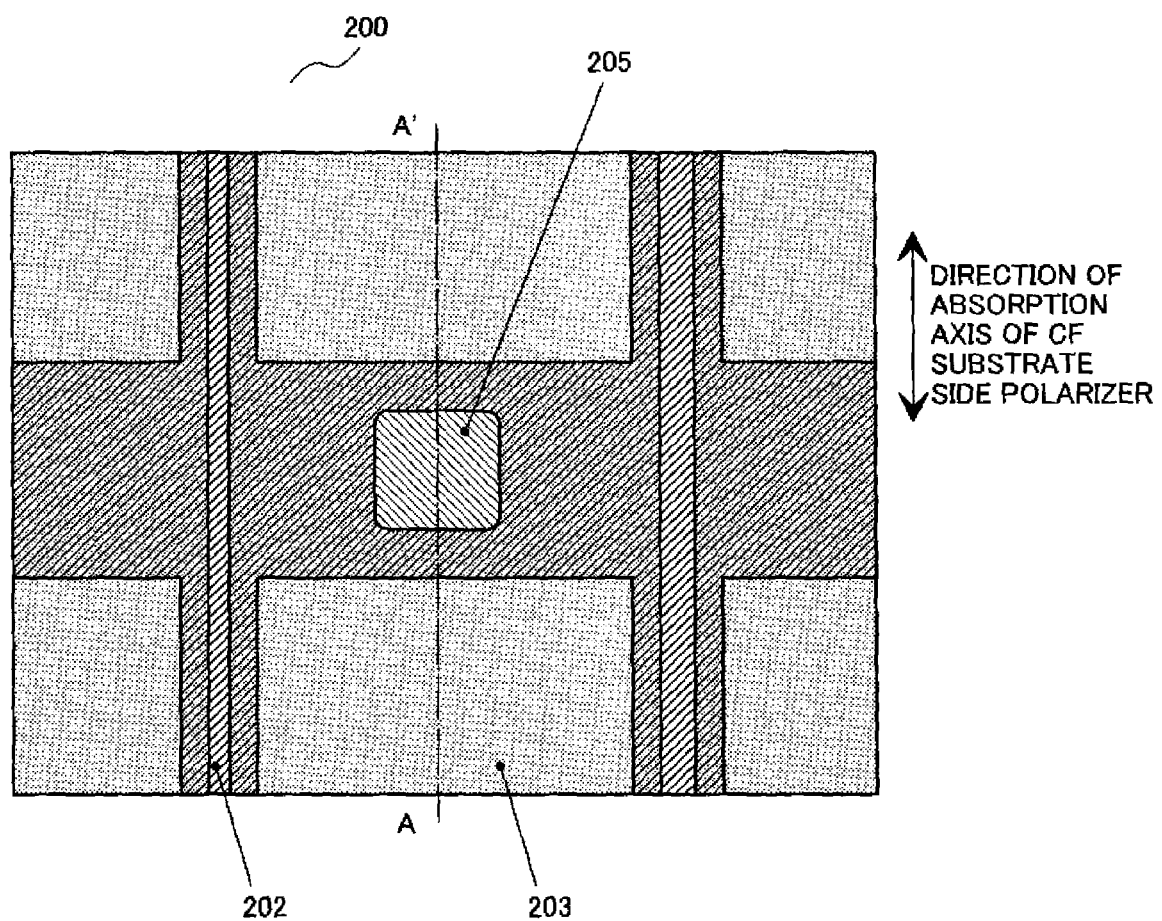
FIG. 3 is a plan view showing a structure of a CF substrate along a line A-A' in FIG. 2.
Figure 4:
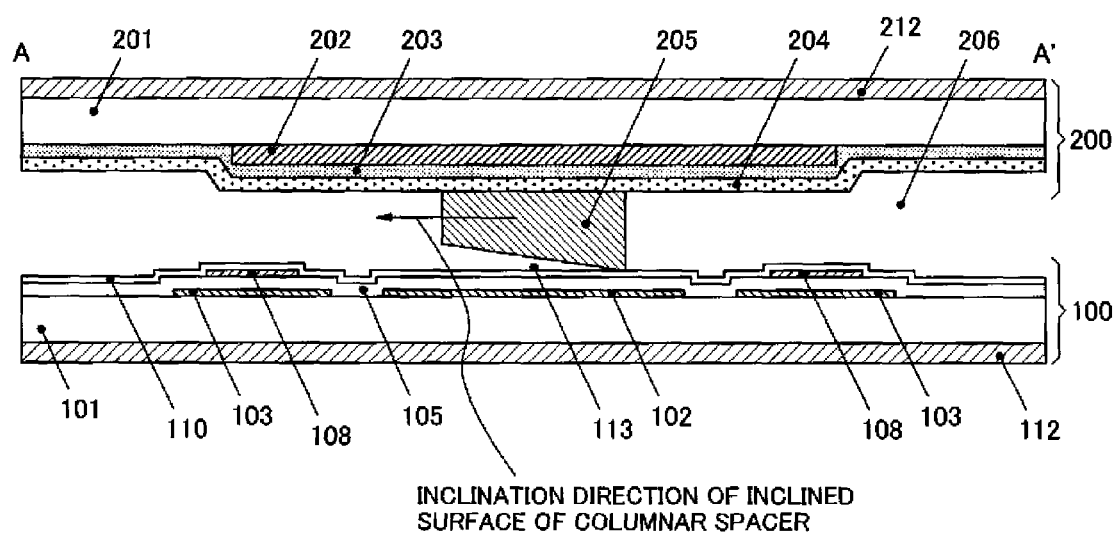
FIG. 4 is a sectional view showing a structure of a liquid crystal display panel along a line A-A' in FIG. 2.
Figure 5:
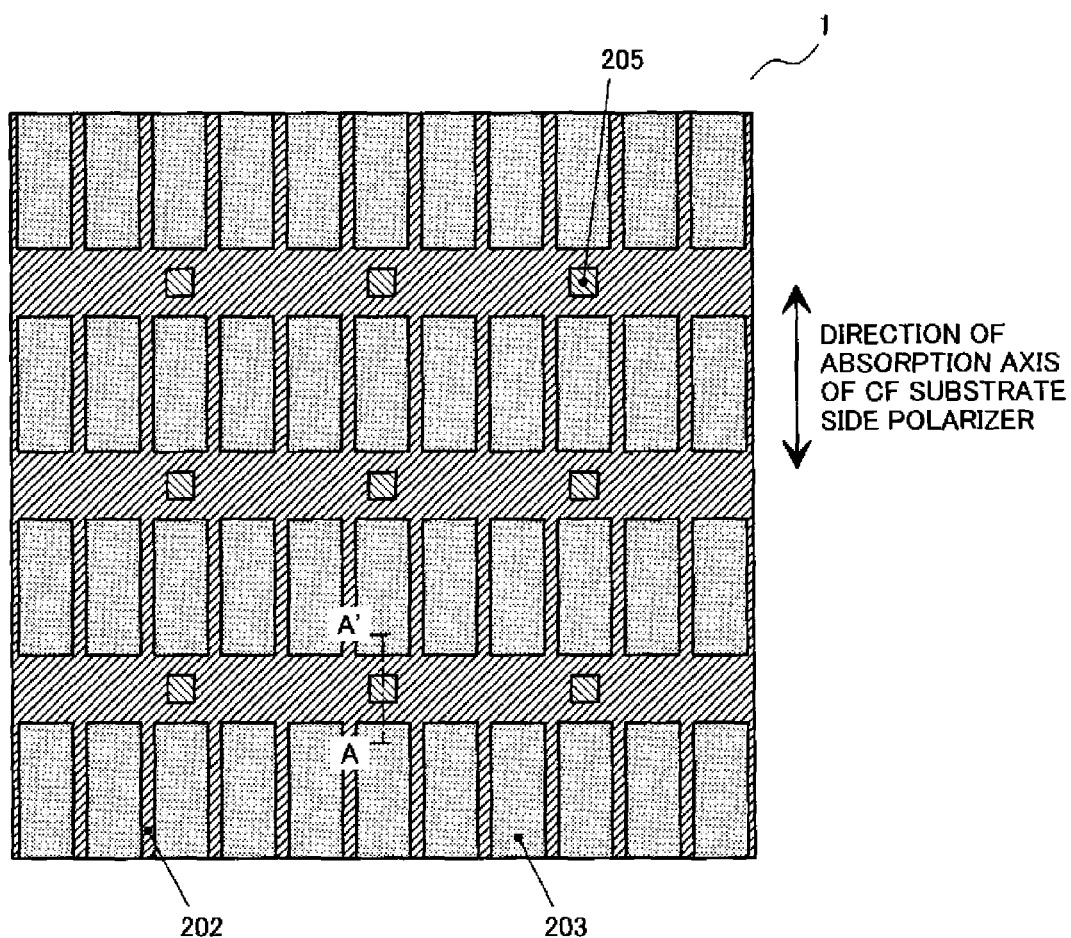
FIG. 5 is an enlarged plan view of a liquid crystal display panel according to a second embodiment of the present invention.
Figure 6:
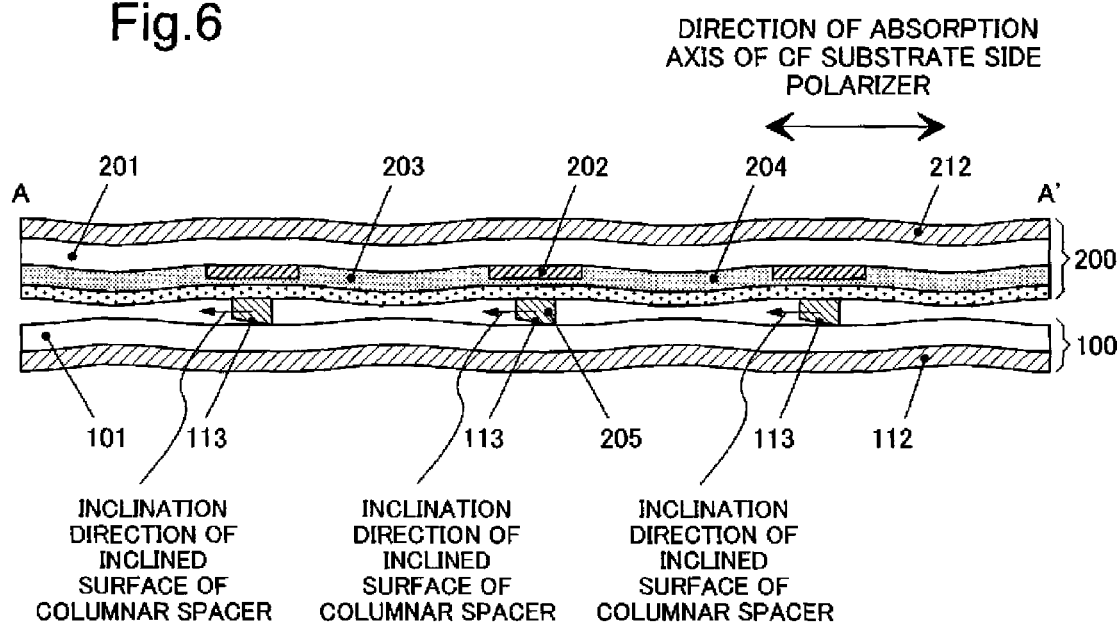
FIG. 6 is a sectional view of a liquid crystal display panel along a line A-A' in FIG. 5.
Figure 7:
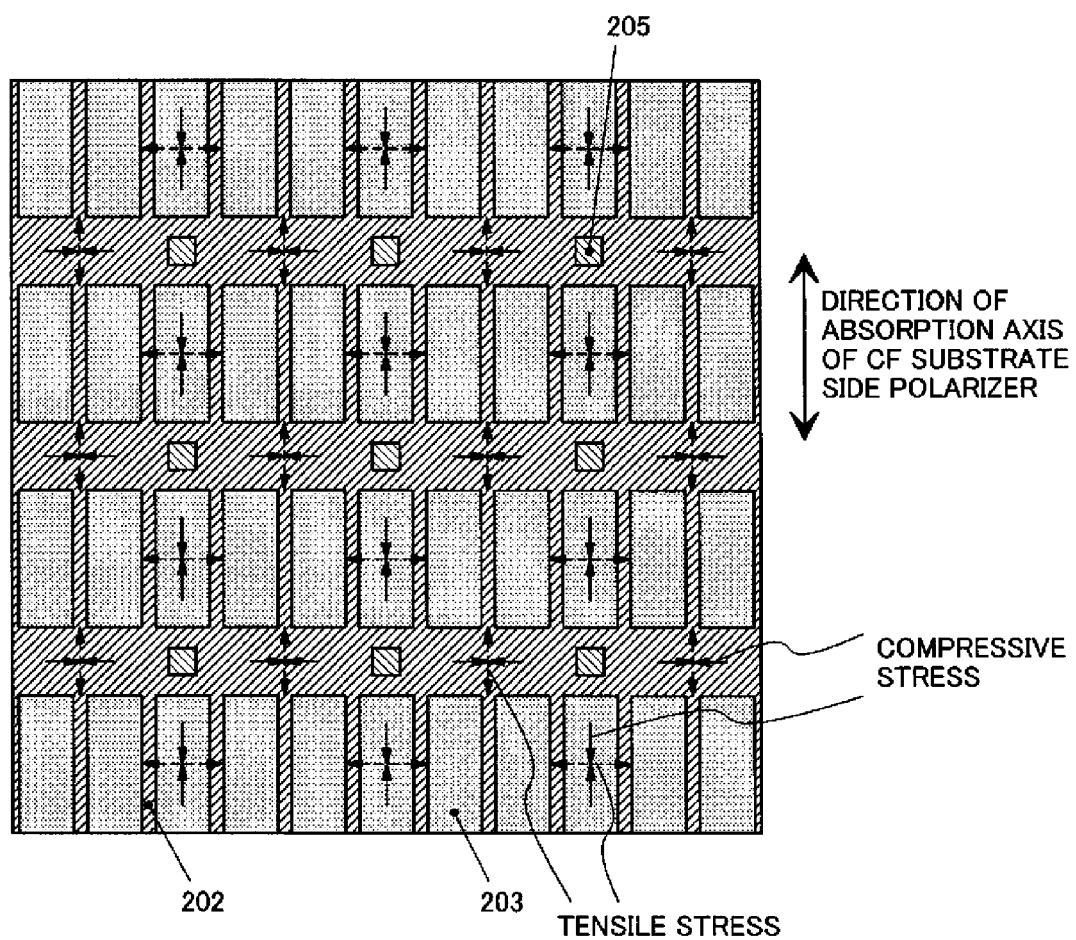
FIG. 7 shows a direction of the residual stress generated in glass in FIG. 5.
Figure 16A:
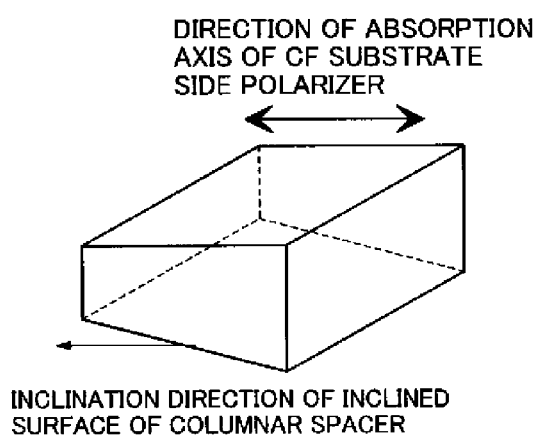
FIGS. 16A and 16B are perspective views showing a shape of a columnar spacer according to a second and a third embodiment.

The embodiment of the present invention mentioned above will be described more in detail. A liquid crystal display device according to a second embodiment of the present invention will be described with reference to FIGS. 2 to 7 and 16A. FIG. 2 is a plan view showing a structure of one pixel on a TFT substrate 100 included in a liquid crystal display panel 1 according to the second embodiment of the present invention. FIG. 3 is a plan view showing a structure of a CF substrate 200 along a line A-A' in FIG. 2. FIG. 4 is a sectional view showing a structure of the liquid crystal display panel 1 along the line A-A' in FIG. 2. FIG. 5 is an enlarged plan view of the liquid crystal display panel 1 according to this embodiment. FIG. 6 is a sectional view of the liquid crystal display panel 1 along a line A-A' in FIG. 5. FIG. 7 shows the direction of the residual stress generated in a glass substrate 101 or 201 in FIG. 5. FIG. 16A is a perspective view showing a shape of a columnar spacer 205.

As shown in FIGS. 2 to 4, the liquid crystal display device of this embodiment includes the TFT substrate 100, the CF substrate 200, the columnar spacer 205 formed in a CF substrate 200 side and a liquid crystal 206 sandwiched between the both substrates. The columnar spacer 205 is arranged in a light shielding portion on a black matrix (hereinafter referred to as BM) 202. The top of the columnar spacer 205 has an inclined surface.

With reference to FIGS. 2 and 3, the TFT substrate 100 includes for example, a gate line 102, a COM line 103, and a COM electrode 104 that are formed in the same layer, a gate insulation film 105 which covers the surface of the gate line 102, the COM line 103, and the COM electrode 104, an a-Si layer 106 formed on the gate insulation film 105 like an island, a drain line 107 which is formed on the gate insulation film 105 or the a-Si layer 106 and formed so as to be perpendicular to the gate line 102, a pixel electrode 108 formed in a layer in which the drain line 107 is formed, and a passivation film 110 which covers the surface of the drain line 107 and the pixel electrode 108.

With reference to FIG. 4, the CF substrate 200 includes for example, the BM 202 that is a light shield film formed on the glass substrate 201, a color layer 203 which is formed so as to cover the BM 202 and a transmission portion in which the BM is not arranged, an overcoat (hereinafter referred to as OC) 204 formed so as to cover the color layer 203, and the columnar spacer 205 which is formed on the OC 204 and the BM 202, formed in a TFT substrate 100 side, and arranged at a position corresponding to the gate line 102. It is desirable that the columnar spacers 205 are arranged in the same color layer. Therefore, in the second embodiment, the columnar spacers 205 are arranged on the BM 202 that corresponds to a blue layer.

A polarizer 212 is formed on an opposite side of a liquid crystal side surface of the CF substrate 200. A polarizer 112 is formed on an opposite side of a liquid crystal side surface of the TFT substrate 100.

A columnar spacer facing portion 113 is formed at a position corresponding to the columnar spacer on the liquid crystal side surface of the TFT substrate.

A liquid crystal display device of this embodiment employs the IPS method. However, the present invention is not limited to the liquid crystal display device employing the IPS method. A direction of the line A-A' in FIGS. 2 and 3 is a direction of an absorption axis of the polarizer of the CF substrate side. An inclination direction of the inclined surface of the top of the columnar spacer 205 is set to a direction parallel to the direction of the absorption axis of the polarizer of the CF substrate side. However, the present invention is not limited to this direction.

With reference to FIG. 16A which is a perspective view showing the columnar spacer 205, a shape of the columnar spacer will be described in detail. As shown in FIG. 16A, in this embodiment, the inclined surface of the top of the columnar spacer 205 is inclined in a direction parallel to the direction of the absorption axis of the polarizer of the CF substrate side and is not inclined in another direction.

Further, an inclination angle of the inclined surface may be set arbitrarily. In this embodiment, the inclination direction of the inclined surface of the top of the columnar spacer 205 is parallel to the direction of the absorption axis of the polarizer of the CF substrate side. As it is clear from the equation 1 that is a relational expression of the predicted value of the emission light intensity mentioned above, the inclination direction may be a direction substantially parallel to or perpendicular to the direction of the absorption axis of the polarizer of the CF substrate 200 side. The emission light intensity can be greatly suppressed by setting the inclination direction to this direction.

A portion opposed to the columnar spacer 205 is provided on the gate line 102 of the TFT substrate 100 side that is a light shielding portion. Moreover, this portion corresponds to a gate line area that is larger than the area of the columnar spacer 205 when viewed from a normal direction of a display surface.

Next, a method for manufacturing a liquid crystal display device of this embodiment will be described.

Figure 24:
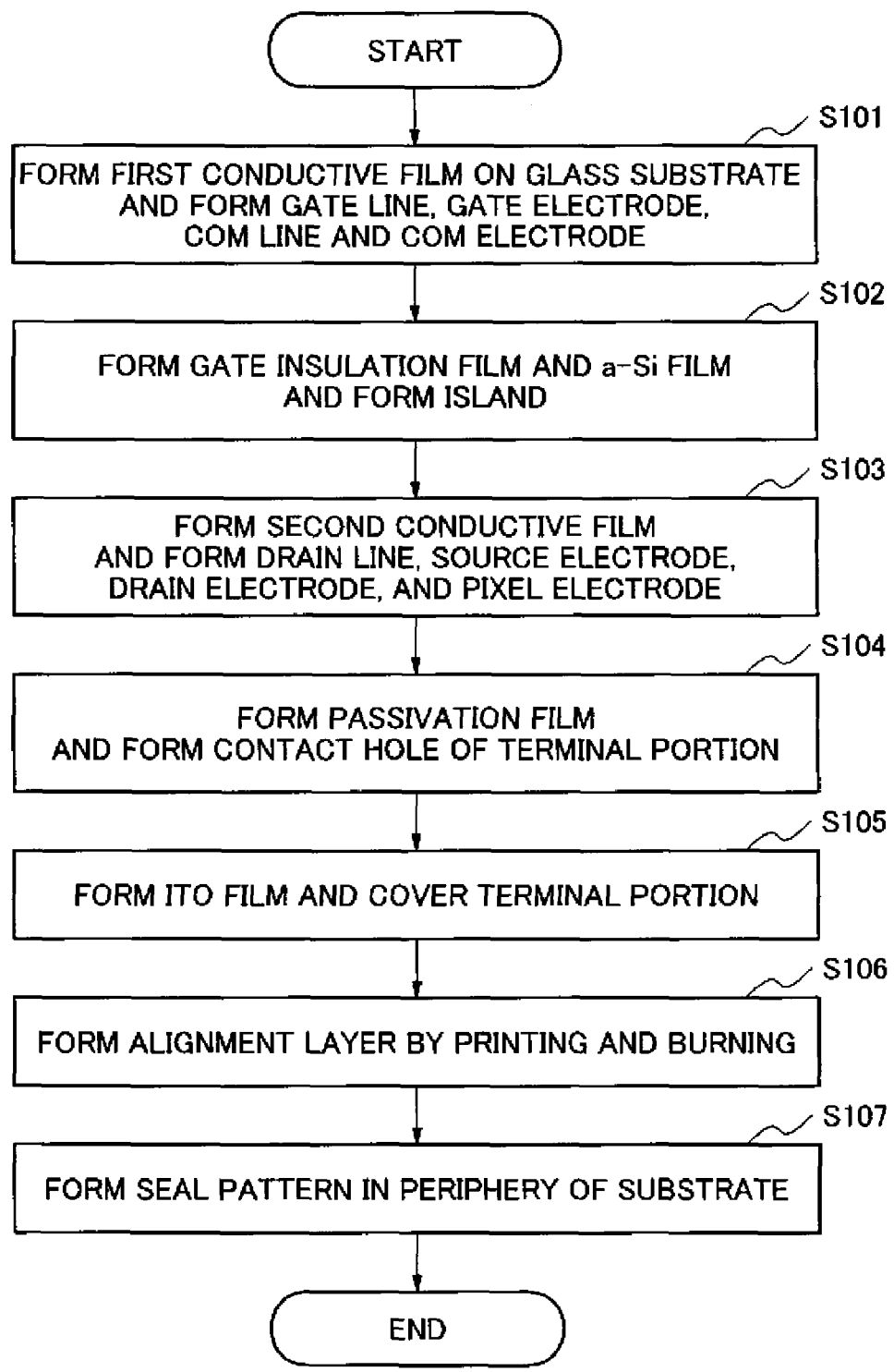
FIG. 24 is a flow chart showing a method for manufacturing a TFT substrate of a liquid crystal display panel according to a second embodiment of the present invention.

First, a method for manufacturing the TFT substrate 100 will be described with reference to FIGS. 2, 4, and 24.

In the TFT substrate 100 side, a film (first conductive film) of a first conductive material is formed on the glass substrate 101 by a sputtering method and the gate line 102, a gate electrode (not shown), the COM line 103 and the COM electrode 104 are formed in the same layer by a photolithography (step S101). The first conductive film has a laminated structure composed of a Chromium (Cr) film and an Aluminum (Al) alloy. The film thickness of the first conductive film is 500 nanometers in total.

Next, the gate insulation film 105 composed of silicon oxynitride and the amorphous silicone (hereinafter, a-Si) layer 106 are formed by a CVD (Chemical Vapor Deposition) method and a patterning of the a-Si layer 106 is performed by the photolithography to form an island (step S102).

A film (second conductive film) of a second conductive material is formed by the sputtering method and the drain line 107, a source electrode, a drain electrode, and the pixel electrode 108 are formed in the same layer by the photolithography (step S103). A Cr film is used for the second conductive film. The film thickness of the second conductive film is 300 nanometers.

Next, the passivation film 110 composed of silicon oxynitride is formed by the CVD method and a contact hole of a terminal portion (not shown) is formed by the photolithography (step S104).

Next, an ITO (Indium Tin Oxide) film is formed by the sputtering method and the surface of the terminal portion is covered with the ITO film by the photolithography (step S105).

Next, an alignment layer (polarizer) is formed on the TFT substrate 100 by printing and burning, and a rubbing process is performed (step S106). The alignment layer is burned at 230 degree C. for 60 minutes.

Next, in a periphery of the TFT substrate, a seal pattern is formed by using a hybrid-type (photo-curable and heat-curable) sealing material 111 (step S107), and the production of the TFT substrate is completed.

Figure 25:
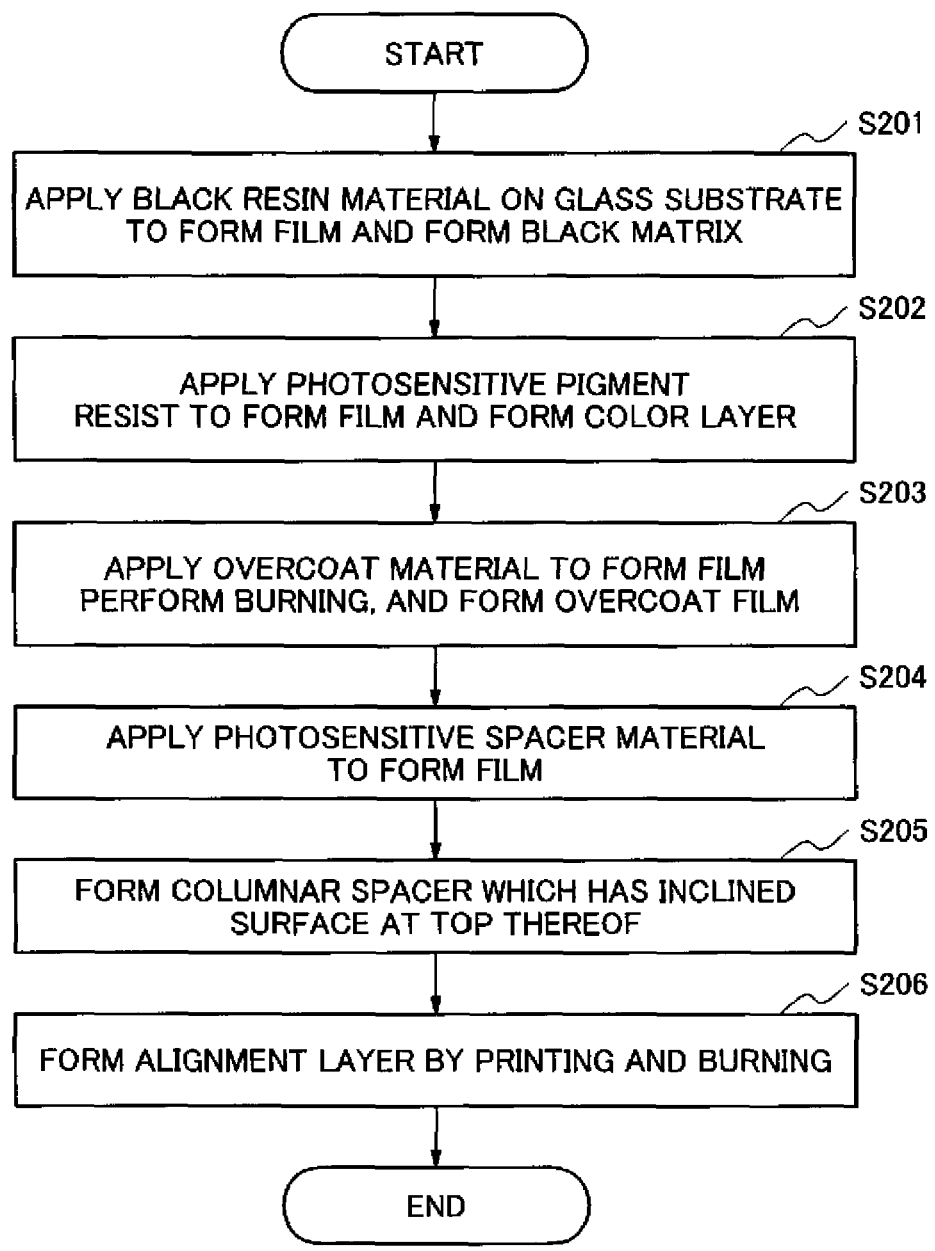
FIG. 25 is a flow chart showing a method for manufacturing a CF substrate of a liquid crystal display panel according to a second embodiment of the present invention.
Figure 26:
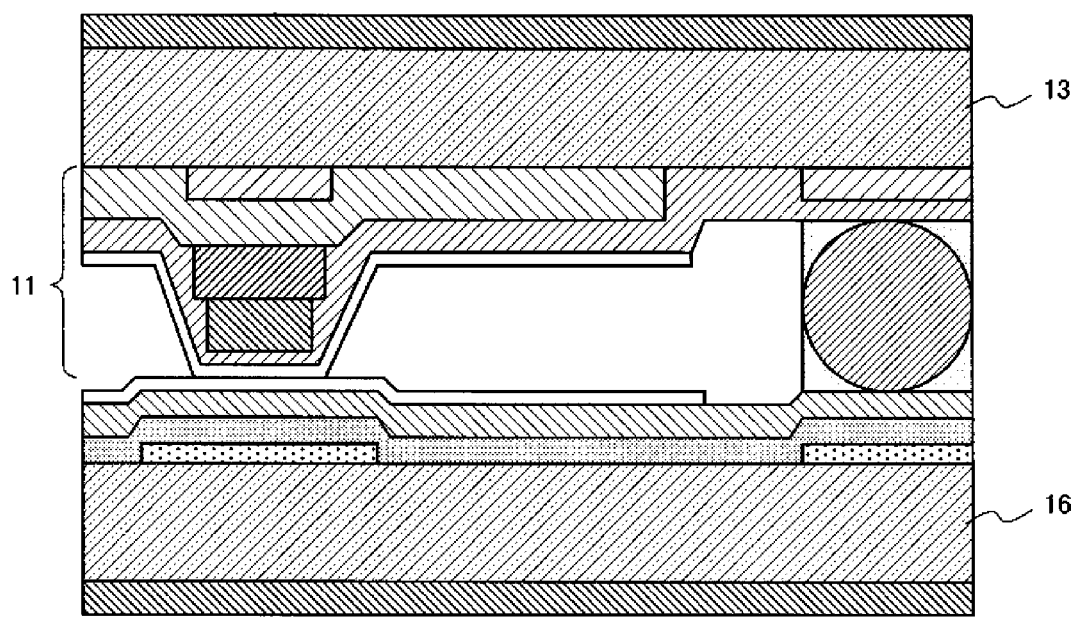
FIG. 26 is a sectional view showing a structure of a liquid crystal display panel in a related art.
Figure 27:
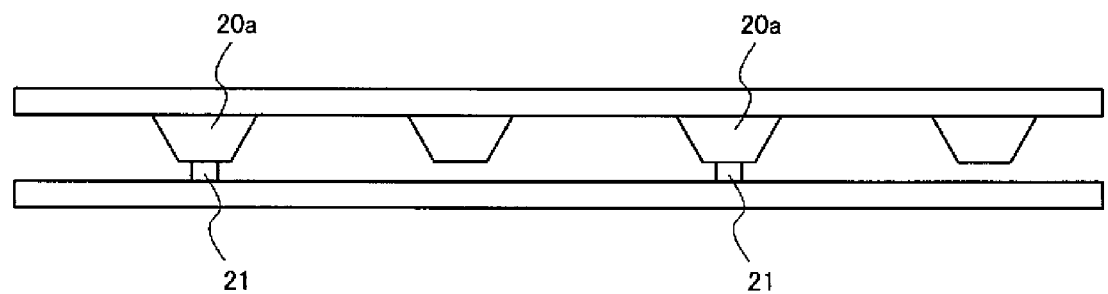
FIG. 27 is a sectional view showing a structure of a liquid crystal display panel in a related art.
Figure 28:
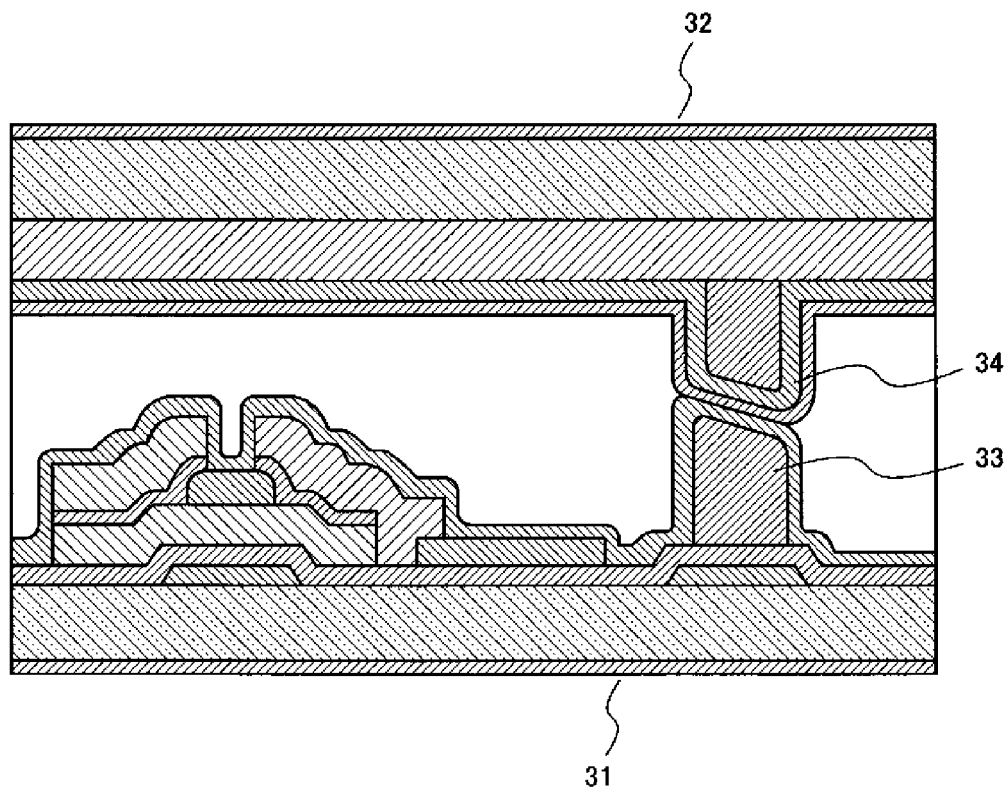
FIG. 28 is a sectional view showing a structure of a liquid crystal display panel in a related art.

Next, a method for manufacturing the CF substrate 200 will be described with reference to FIGS. 4 and 25.

In the CF substrate 200 side, a black resin material is applied on the glass substrate 201 to form a film, and the BM 202 is formed by the photolithography (step S201).

Next, a photosensitive pigment resist of green, red and blue is applied to form a film thereof and the color layer 203 is formed by the photolithography (step S202).

Next, a heat-curable OC material composed of an acrylic material is applied to form a film thereof. This film is burned to form the OC 204 (Step S203). The film thickness of the OC 204 after burning is 1.5 micrometers.

Next, a photosensitive columnar spacer material composed of an acrylic material is applied to form a film thereof (step S204). The columnar spacer 205 is formed by the photolithography. Here, the height of the columnar spacer 205 measured from a surface of the transmission portion of the blue color layer 203 is 3.7 micrometers. A mask with a slit having a tapered shape is used for an exposure of the columnar spacer 205. As a result, the columnar spacer 205 which has the inclined surface at the top is formed (step S205).

Next, the alignment layer (polarizer) is formed by printing and burning on the CF substrate 200 and the rubbing process is performed. The alignment layer is burned at 230 degree C. for 60 minutes (step S206), and the production of the CF substrate 200 is completed.

Next, the TFT substrate and the CF substrate that are produced by the above-mentioned process are bonded together while sandwiching a liquid crystal between the both substrates.

The liquid crystal 206 is dropped on a surface of either the TFT substrate or the CF substrate. The TFT substrate is put on the CF substrate at a predetermined position in vacuum so that the both substrates are bonded together. The both substrates are closely positioned together and those are put in atmosphere. By this means, the both substrates are bonded together.

In this embodiment, the height of the columnar spacer 205 is measured in advance and the amount of the liquid crystal to be dropped is adjusted according to the measurement result. As a result, an amount of compression of the columnar spacer is controlled to about 0.2 micrometers. The cell gap is 4.0 micrometers.

Next, the seal pattern is irradiated with UV light and the sealing material 111 is cured by heating. By the above-mentioned method, the bonded substrate is produced. The amount of the UV light with which the sealing material 111 is irradiated is 3000 mJ. The sealing material is heated for 60 minutes at the curing temperature of 120 degree C.

Next, the bonded substrate is divided in the unit of the panel. A polarizer is bonded on the both surfaces of the panel and the production of the liquid crystal display panel is completed.

Further, in this embodiment, although the columnar spacer is formed on the CF substrate, the columnar spacer may be formed on the TFT substrate. In this embodiment, although the columnar spacer has the inclined surface at the top, an opposed portion having an inclined surface may be formed at a position corresponding to the columnar spacer in a surface opposed to a surface in which the columnar spacer is formed.

Next, the operation and effect of the liquid crystal display device of this embodiment will be described.

In order to form the cell gap having a state in which the columnar spacer is compressed by several percent, a force is applied between the inclined surface of the top of the columnar spacer 205 and the surface of the TFT substrate 100 which is contact with the columnar spacer 205 at all times. A deflection of the glass substrates 101 and 201 caused by this force generates the residual stress inside the glass. In the liquid crystal display device of the related technology, when a stress is applied from the outside, the residual stress in the glass is generated in an irregular direction. Because the direction of the residual stress cannot be uniquely determined for the direction and the magnitude of the stress, the light leakage defect is generated.

In contrast, the inclination direction of the inclined surface of the top of the columnar spacer 205 of this embodiment is parallel to the direction of the absorption axis of the polarizer of the CF substrate side when viewed from a normal direction of a display surface. FIG. 6 shows a cross-sectional surface along the line A-A' in FIG. 5. The deflection of the glass substrate caused by the columnar spacer 205 is exaggeratingly shown. As shown in FIG. 6, the deflection of the glass substrate continuously varies along the direction of the absorption axis of the polarizer of the CF substrate side.

As mentioned above, the deflection generated in the glass substrate continuously varies and is displaced in the direction substantially parallel to a direction of an optical axis. Accordingly, the direction of the residual stress such as the compressive stress, the tensile stress, or the like generated in the panel is substantially parallel to or perpendicular to the direction of the absorption axis of the polarizer of the CF substrate side. In this embodiment, as shown in FIG. 7, the compressive stress substantially parallel to the direction of the absorption axis of the polarizer of the CF substrate side and the tensile stress perpendicular to the direction of the absorption axis of the polarizer of the CF substrate side are generated between the columnar spacers in the panel surface.

As mentioned above, the residual stress generated in the direction parallel to or perpendicular to the direction of the absorption axis of the polarizer of the display surface side does not cause the light leakage. That is, the amount of the light leakage continuously varies with the angle between the residual stress and the absorption axis of the polarizer and becomes the maximum when the angle is 45 degrees.

For this reason, when a stress is applied to the panel from the outside, the direction of the residual stress in the glass becomes parallel to or perpendicular to the direction of the absorption axis of the polarizer of the display surface side by the inclination of the top of the columnar spacer. As a result, the light leakage caused by the retardation of the glass is suppressed.

Embodiment 3

Figure 8:
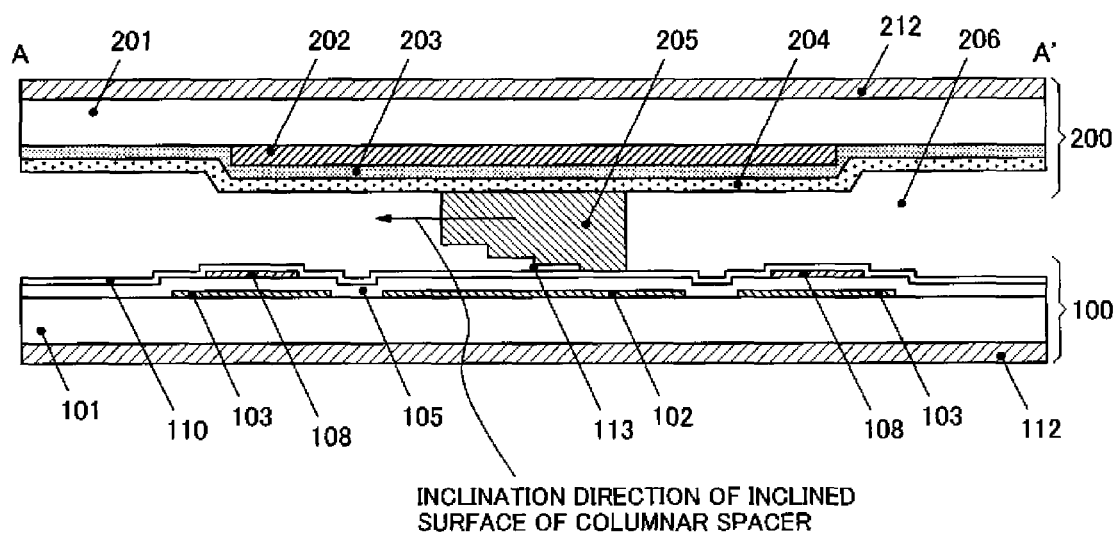
FIG. 8 is a sectional view showing a structure of a liquid crystal display panel according to a third embodiment of the present invention.
Figure 16B:
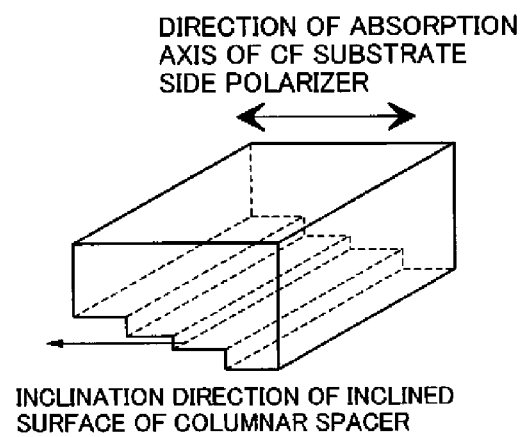

Next, a liquid crystal display device according to a third embodiment of the present invention will be described with reference to FIGS. 8 and 16B. FIG. 8 is a sectional view showing a structure of the liquid crystal display panel according to the third embodiment of the present invention. FIG. 16B is a perspective view showing a shape of the columnar spacer. FIG. 8 shows a cross-sectional surface of the liquid crystal display panel according to the third embodiment along a line A-A' whose direction is the same as that of the second embodiment. The direction along the line A-A' is the direction of the absorption axis of the polarizer of the CF substrate side.

As shown in FIG. 8, in the third embodiment, the top of the columnar spacer 205 has an inclined surface formed in a stepped shape. The shape of the columnar spacer 205 is different from that of the second embodiment. A structure of the liquid crystal display panel according to the third embodiment is the same as that of the second embodiment except the shape of the columnar spacer.

The shape of the columnar spacer will be described in detail with reference to FIG. 16B that is a perspective view of the columnar spacer 205. As shown in FIG. 16B, the inclined surface formed in a stepped shape at the top of the columnar spacer 205 is inclined in a direction parallel to the direction of the absorption axis of the polarizer of the CF substrate side. In this embodiment, this inclined surface is not inclined in another direction. Further, the number of the steps and a difference between the steps may be set arbitrarily.

Next, a method for manufacturing a liquid crystal display device according to the third embodiment will be described. In the third embodiment, halftone masks whose transmittances are different from each other are used for the exposure of the columnar spacer 205. By using the halftone masks, the columnar spacer having the inclined surface formed in a stepped shape at the top can be defined.

Other steps of the manufacturing method are the same as those of the second embodiment. The liquid crystal display device according to the third embodiment has the same effect as the liquid crystal display device according to the second embodiment. Additionally, the liquid crystal display device according to the third embodiment has advantages in which the inclined surface of the columnar spacer 205 can be easily formed and the inclination direction can be accurately formed.

Embodiment 4

Figure 9:
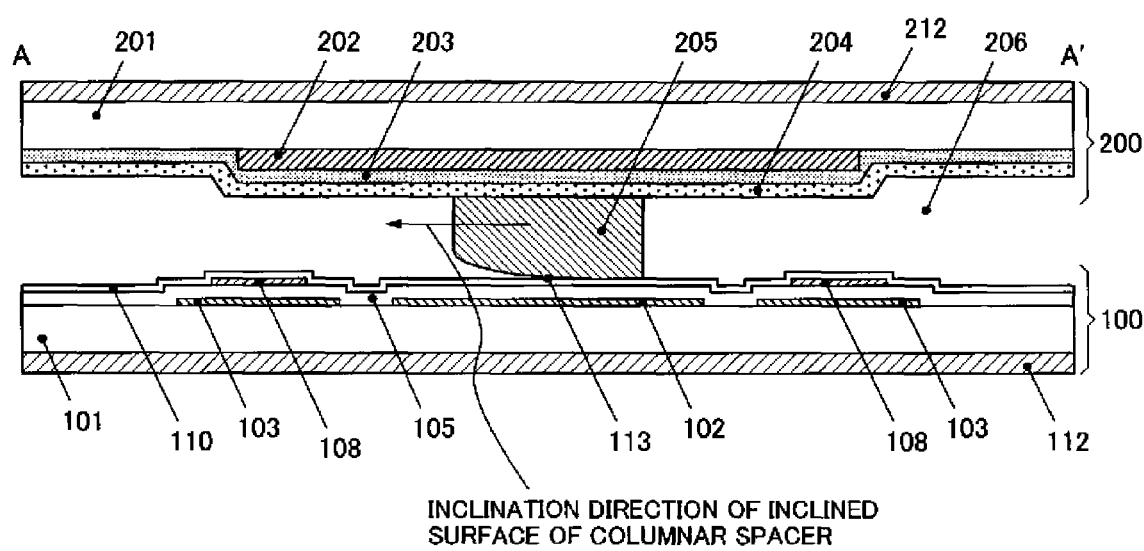
FIG. 9 is a sectional view showing a structure of a liquid crystal display panel according to a fourth embodiment of the present invention.

Next, a liquid crystal display device according to a fourth embodiment of the present invention will be described with reference to FIG. 9. FIG. 9 is a sectional view showing a structure of a liquid crystal display panel according to the fourth embodiment of the present invention. FIG. 9 shows a cross-sectional surface of the liquid crystal display panel according to the fourth embodiment along a line A-A' whose direction is the same as that of the second embodiment. The direction along the line A-A' is the direction of the absorption axis of the polarizer of the CF substrate side.

As shown in FIG. 9, in the fourth embodiment, the top of the columnar spacer 205 has a curved inclined surface. The shape of the columnar spacer 205 is different from that of the second embodiment. A structure of the liquid crystal display panel according to the fourth embodiment is the same as that of the second embodiment except the shape of the columnar spacer. Further, a curvature radius of the curved surface can be set arbitrarily.

Next, a method for manufacturing a liquid crystal display device according to the fourth embodiment will be described. In the fourth embodiment, a mask having a curved tapered slit is used for the exposure of the columnar spacer 205. By using this mask, the columnar spacer which has the curved inclined surface at the top can be formed.

Other steps of the manufacturing method are the same as those of the second embodiment. The liquid crystal display device according to the fourth embodiment has the same effect as the liquid crystal display device according to the second embodiment. Additionally, the liquid crystal display device according to the fourth embodiment has advantages in which because the inclined surface is curved, in particular, displacement of the substrate around the columnar spacer becomes small and deviation in the residual stress can be suppressed.

Embodiment 5

Figure 10:
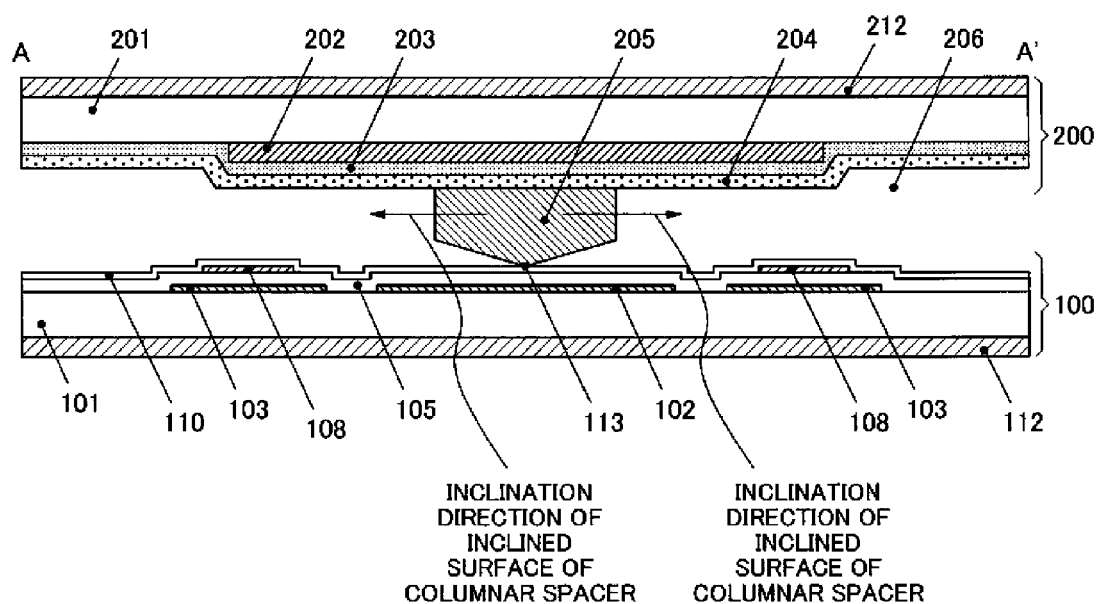
FIG. 10 is a sectional view showing a structure of a liquid crystal display panel according to a fifth embodiment of the present invention.

Next, a liquid crystal display device according to a fifth embodiment of the present invention will be described with reference to FIG. 10. FIG. 10 is a sectional view showing a structure of the liquid crystal display panel according to the fifth embodiment of the present invention. FIG. 10 shows a cross-sectional surface of the liquid crystal display panel according to the fifth embodiment along a line A-A' whose direction is the same as that of the second embodiment. The direction along the line A-A' is the direction of the absorption axis of the polarizer of the CF substrate side.

As shown in FIG. 10, in the fifth embodiment, the top of the columnar spacer 205 has two inclined surfaces which are inclined in two directions parallel to the direction of the absorption axis of the polarizer of the CF substrate. The shape of the columnar spacer 205 is different from that of the second embodiment. A structure of the liquid crystal display panel according to the fifth embodiment is the same as that of the second embodiment except the shape of the columnar spacer. Further, the inclination angle and a position of the top can be set arbitrarily. The inclination angles of two inclined surfaces may be different from each other.

Next, a method for manufacturing a liquid crystal display device according to the fifth embodiment will be described. In the fifth embodiment, a mask having a tapered slit is used for the exposure of the columnar spacer 205. By using this mask, the columnar spacer 205 having two inclined surfaces at the top which are inclined in two directions parallel to the direction of the absorption axis of the polarizer is formed.

Other steps of the manufacturing method are the same as those of the second embodiment. The liquid crystal display device according to the fifth embodiment has the same effect as the liquid crystal display device according to the second embodiment. Additionally, the liquid crystal display device according to the fifth embodiment has advantages in which because one columnar spacer has two inclined surfaces, displacement of the substrate around the columnar spacer becomes small and deviation of the residual stress can be suppressed.

Embodiment 6

Figure 11:
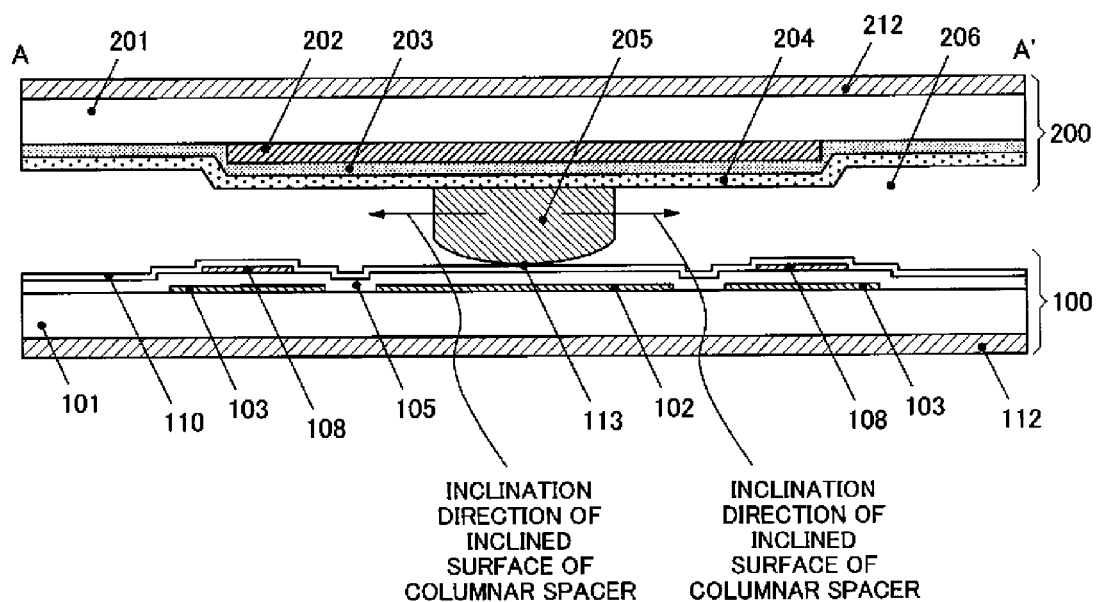
FIG. 11 is a sectional view showing a structure of a liquid crystal display panel according to a sixth embodiment of the present invention.

Next, a liquid crystal display device according to a sixth embodiment of the present invention will be described with reference to FIG. 11. FIG. 11 is a sectional view showing a structure of the liquid crystal display panel according to the sixth embodiment of the present invention. FIG. 11 shows a cross-sectional surface of the liquid crystal display panel according to the sixth embodiment along a line A-A' whose direction is the same as that of the second embodiment. The direction along the line A-A' is the direction of the absorption axis of the polarizer of the CF substrate side.

As shown in FIG. 11, in the sixth embodiment, the top of the columnar spacer 205 has two curved inclined surfaces which are inclined in two directions parallel to the direction of the absorption axis of the polarizer of the CF substrate. The shape of the columnar spacer 205 is different from that of the second embodiment. A structure of the liquid crystal display panel according to the sixth embodiment is the same as that of the second embodiment except the shape of the columnar spacer. Further, a curvature radius of the curved surface and a position of the top can be set arbitrarily. The curvature radii of two curved surfaces may be different from each other.

Next, a method for manufacturing a liquid crystal display device according to the sixth embodiment will be described. In the sixth embodiment, a mask having a curved tapered slit is used for the exposure of the columnar spacer 205. By using this mask, the columnar spacer 205 having two curved inclined surfaces at the top which are inclined in two directions parallel to the direction of the absorption axis of the polarizer is formed.

Other steps of the manufacturing method are the same as those of the second embodiment. The liquid crystal display device according to the sixth embodiment has the same effect as the liquid crystal display device according to the second embodiment. Additionally, the liquid crystal display device according to the sixth embodiment has advantages in which because one columnar spacer has two curved inclined surfaces, displacement of the substrate around the columnar spacer becomes small and deviation of the residual stress can be suppressed.

Embodiment 7

Figure 12:
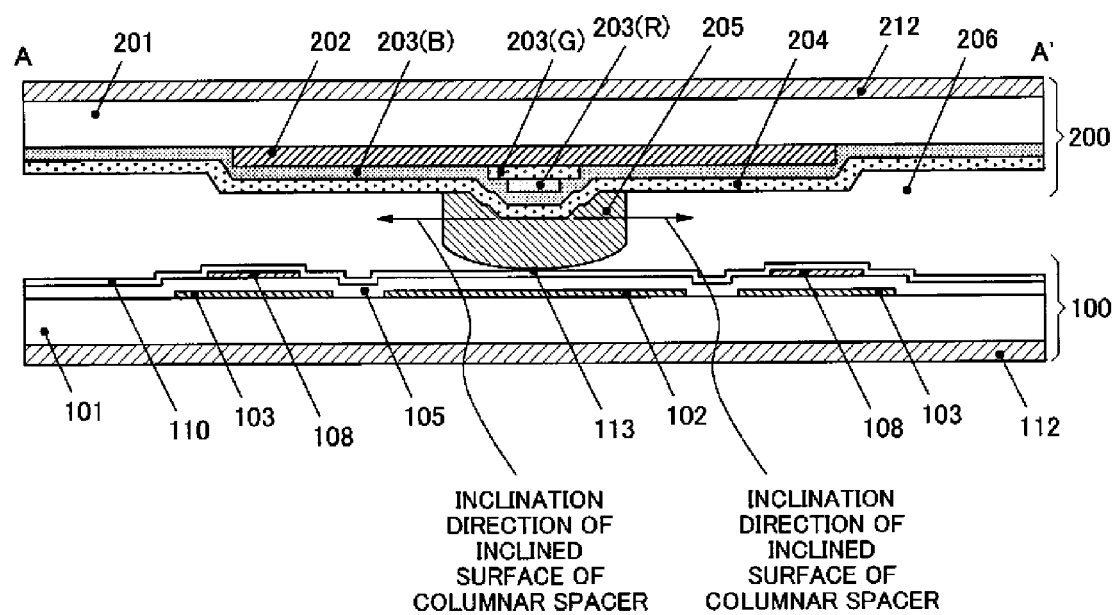
FIG. 12 is a sectional view showing a structure of a liquid crystal display panel according to a seventh embodiment of the present invention.

Next, a liquid crystal display device according to a seventh embodiment of the present invention will be described with reference to FIG. 12. FIG. 12 is a sectional view showing a structure of a liquid crystal display panel according to a seventh embodiment of the present invention. FIG. 12 shows a cross-sectional surface of the liquid crystal display panel according to the seventh embodiment along a line A-A' whose direction is the same as that of the second embodiment. The direction along the line A-A' is the direction of the absorption axis of the polarizer of the CF substrate side.

As shown in FIG. 12, in the seventh embodiment, the top of the columnar spacer 205 has two curved inclined surfaces which are inclined in two directions parallel to the direction of the absorption axis of the polarizer of the CF substrate like the sixth embodiment. In this embodiment, the plurality of color layers 203 are stacked at a lower portion of the columnar spacer 205. Therefore, the structure of the columnar spacer 205 is different from that of the sixth embodiment. The structure of the liquid crystal display panel according to the seventh embodiment is the same as that of the sixth embodiment except the structure of the columnar spacer.

Next, a method for manufacturing the liquid crystal display device according to the seventh embodiment will be described.

In the CF substrate 200 side, a black resin material is applied on the glass substrate 201 to form a film and the BM 202 is formed by the photolithography.

Next, photosensitive pigment resists of green, red and blue are applied to form films thereof and the color layers 203 are formed by the photolithography. At that time, as shown in FIG. 12, the color layer 203 (G), the color layer 203 (R) and the color layer 203 (B) are stacked in a stepped shape at the lower portion of the columnar spacer 205. The OC 204 and the columnar spacer 205 are formed on the upper portion of the stacked color layer by using a production method that is the same as the method used for the second embodiment.

By a leveling property of the OC 204 and the columnar spacer 205, the top of the columnar spacer 205 has a curved tapered shape.

In this embodiment, the color layer 203 (G) and the color layer 203 (R) which are formed in a stepped shape at the lower portion of the columnar spacer 205 are larger than the columnar spacer 205 in the direction perpendicular to the direction of the absorption axis of the polarizer of the CF substrate side. As a result, the columnar spacer 205 having a curved tapered shape in only the direction parallel to the direction of the absorption axis of the polarizer of the CF substrate side is formed.

Other steps of the manufacturing method are the same as those of the second embodiment. The liquid crystal display device according to the seventh embodiment has the same effect as the liquid crystal display device according to the second embodiment. Additionally, the liquid crystal display device according to the seventh embodiment has advantages in which because the color layer can be effectively arranged on the surface of the CF substrate by forming the color layer to a columnar spacer forming portion on the BM of the CF substrate, color unevenness can be reduced and a density of the liquid crystal display panel can be made high.

Embodiment 8

Figure 13:
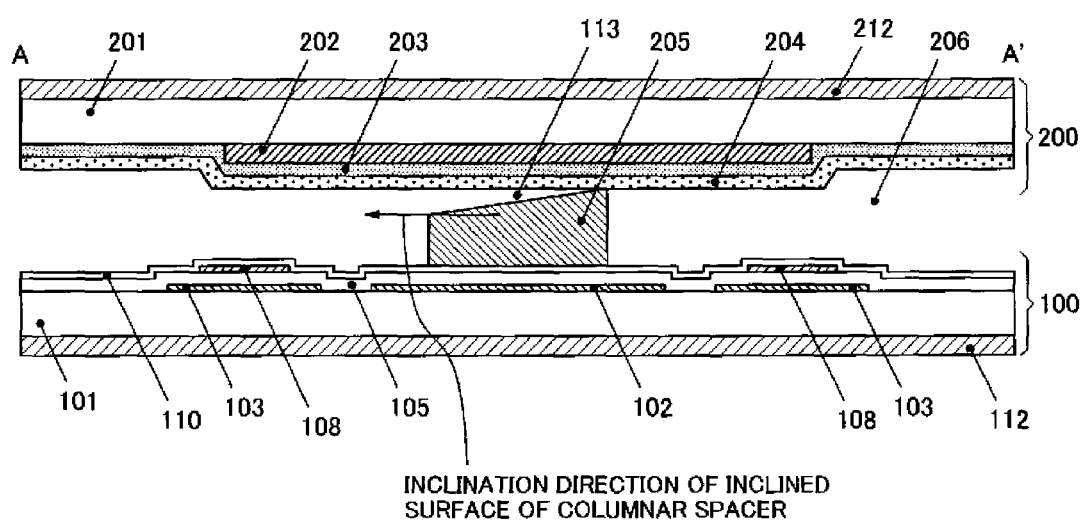
FIG. 13 is a sectional view showing a structure of a liquid crystal display panel according to an eighth embodiment of the present invention.

Next, a liquid crystal display device according to an eighth embodiment of the present invention will be described with reference to FIG. 13. FIG. 13 is a sectional view showing a structure of a liquid crystal display panel according to an eighth embodiment of the present invention. FIG. 13 shows a cross-sectional surface of the liquid crystal display panel according to the eighth embodiment along a line A-A' whose direction is the same as that of the second embodiment. The direction along the line A-A' is the direction of the absorption axis of the polarizer of the CF substrate side.

As shown in FIG. 13, in the eighth embodiment, the columnar spacer 205 is formed to the TFT substrate 100 side. A location at which the columnar spacer 205 is formed is different from that of the second embodiment. A structure of the liquid crystal display panel according to the eighth embodiment is the same as that of the second embodiment except the location at which the columnar spacer 205 is formed. Further, the shape of the columnar spacer 205 formed on the TFT substrate 100 side may be equal to the shape of the columnar spacer 205 shown in one of the third to the sixth embodiments.

Next, a method for manufacturing a liquid crystal display device according to the eighth embodiment will be described.

The TFT substrate 100 is formed by using a manufacturing method that is the same as that of the second embodiment. After that, a photosensitive columnar spacer material including an acrylic material is applied to form a film. The columnar spacer 205 is formed by the photolithography. The columnar spacer is not formed to the CF substrate 200 side.

Other steps of the manufacturing method are the same as those of the second embodiment. The liquid crystal display device according to the eighth embodiment has the same effect as the liquid crystal display device according to the second embodiment. Additionally, the liquid crystal display device according to the eighth embodiment has advantages in which because the columnar spacer is not formed on the CF substrate, a display surface with high surface uniformity can be obtained.

Embodiment 9

Figure 14:
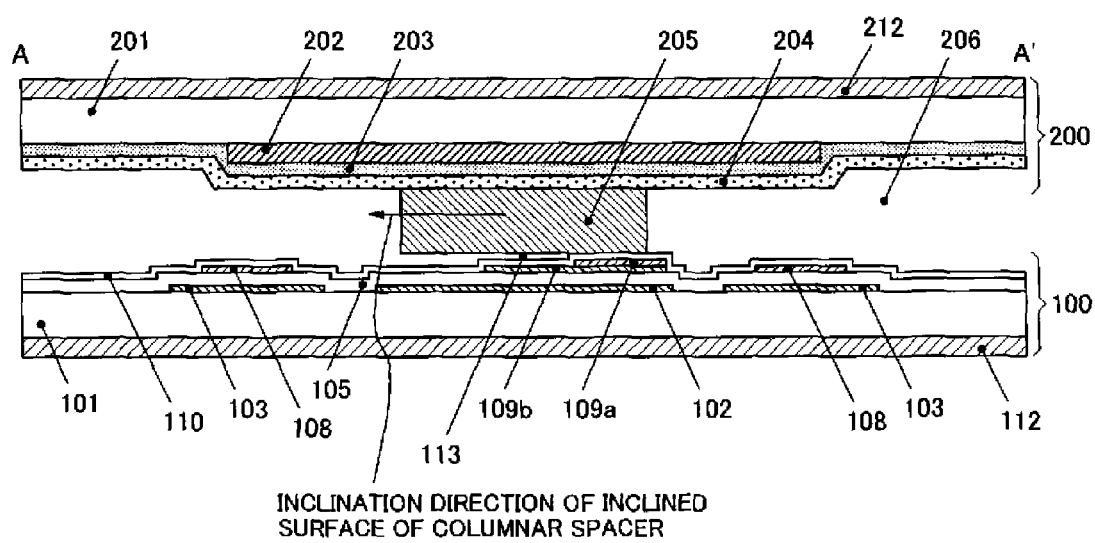
FIG. 14 is a sectional view showing a structure of a liquid crystal display panel according to a ninth embodiment of the present invention.

Next, a liquid crystal display device according to a ninth embodiment of the present invention will be described with reference to FIG. 14. FIG. 14 is a sectional view showing a structure of a liquid crystal display panel according to a ninth embodiment of the present invention. FIG. 14 shows a cross-sectional surface of the liquid crystal display panel according to the ninth embodiment along a line A-A' whose direction is the same as that of the second embodiment. The direction along the line A-A' is the direction of the absorption axis of the polarizer of the CF substrate side.

As shown in FIG. 14, in the ninth embodiment, the top of the columnar spacer 205 has a flat surface. In contrast, opposed portions 109a and 109b on the TFT substrate 100 that face the columnar spacer 205 have an inclined surface formed in a stepped shape. In the ninth embodiment, the surface of the TFT substrate is formed in a stepped shape. This is different from the second embodiment. A structure of the liquid crystal display panel according to the ninth embodiment is the same as that of the second embodiment except this point. Further, the columnar spacer 205 shown in one of the second to the sixth embodiments may be used instead of the columnar spacer 205 whose top has a flat surface.

Next, a method for manufacturing a liquid crystal display device according to the ninth embodiment will be described.

In the TFT substrate 100 side, a film (first conductive film) of a first conductive material is formed on the glass substrate 101 by the sputtering method. After this process, the gate line 102, the gate electrode (not shown), the COM line 103 and the COM electrode 104 are formed in the same layer by the photolithography. The first conductive film has a laminated structure composed of a Cr film and an Al alloy. The film thickness of the first conductive film is 500 nanometers in total.

Next, the gate insulation film 105 including silicon oxynitride and the a-Si layer 106 are formed by the CVD method. After that, a patterning of the a-Si layer 106 is performed by the photolithography to form an island.

Next, a film of a second conductive material is formed by the sputtering method. After this process, a step film 109a is formed by the photolithography.

Next, a film of a third conductive material is formed by the sputtering method. After this process, the drain line 107, the source electrode (not shown), the drain electrode (not shown), the pixel electrode 108 and the step film 109b are formed in the same layer by the photolithography. The Cr film is used for the second and third conductive film. The film thickness of the conductive film is 300 nanometers.

Next, the passivation film 110 including silicon oxynitride is formed by the CVD method. After this process, a contact hole of a terminal portion (not shown) is formed by the photolithography.

Next, the ITO film is formed by the sputtering method. After this process, the surface of the terminal portion is covered with the ITO film by the photolithography.

Next, the CF substrate 200 side is exposed by using the conventional photolithography and the columnar spacer 205 which has a flat surface at the top is formed on the CF substrate 200.

Other steps of the manufacturing method are the same as those of the second embodiment. The liquid crystal display device according to the ninth embodiment has the same effect as the liquid crystal display device according to the second embodiment. Additionally, the liquid crystal display device according to the ninth embodiment has advantages in which because the inclined surface is not formed to the columnar spacer formed in the CF substrate, the CF substrate can be easily manufactured and a display surface with high surface uniformity can be obtained.

Embodiment 10

Figure 15:
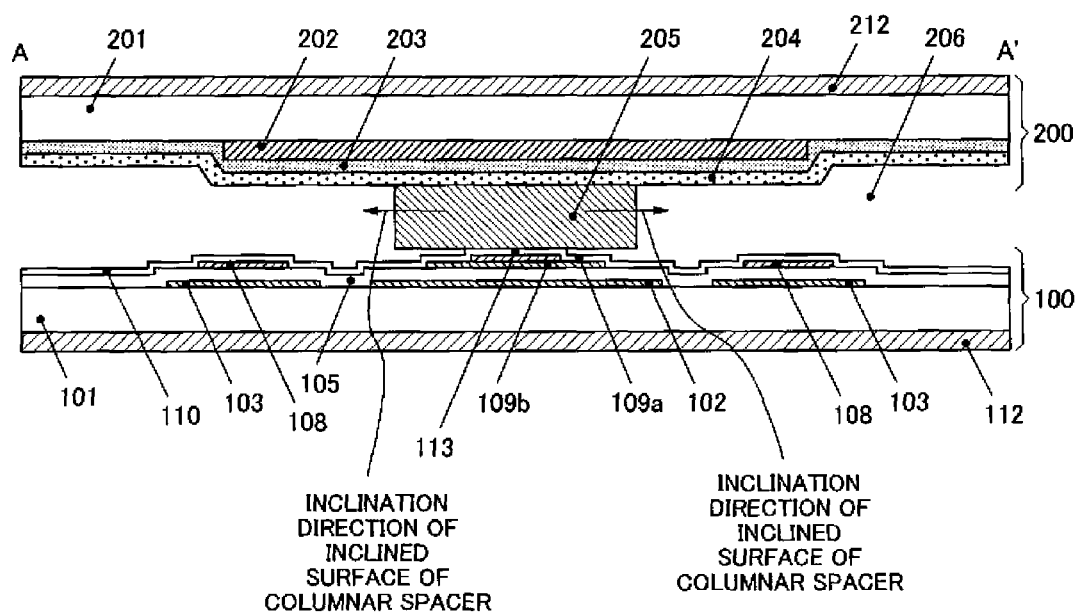
FIG. 15 is a sectional view showing a structure of a liquid crystal display panel according to a tenth embodiment of the present invention.

Next, a liquid crystal display device according to a tenth embodiment of the present invention will be described with reference to FIG. 15. FIG. 15 is a sectional view showing a structure of a liquid crystal display panel according to the tenth embodiment of the present invention. FIG. 15 shows a cross-sectional surface of the liquid crystal display panel according to the tenth embodiment along a line A-A' whose direction is the same as that of the second embodiment. The direction along the line A-A' is the direction of the absorption axis of the polarizer of the CF substrate side.

As shown in FIG. 15, in the tenth embodiment, the top of the columnar spacer 205 has a flat surface. In contrast, the opposed portions 109a and 109b on the TFT substrate 100 that face the columnar spacer 205 have the inclined surface formed in a stepped shape in two directions parallel to the direction of the absorption axis of the polarizer of the CF substrate. In the tenth embodiment, the surface of the TFT substrate is formed in a stepped shape. This feature is a difference from the second embodiment. A structure of the liquid crystal display panel according to the tenth embodiment is the same as that of the second embodiment except this point. Further, although the opposed portions 109a and 109b on the TFT substrate 100 have a symmetrical shape as shown in FIG. 15, the opposed portion may have an asymmetrical shape. Further, the columnar spacer 205 shown in one of the second to the sixth embodiments may be used instead of the columnar spacer 205, a top portion of which has a flat surface.

The manufacturing method of the tenth embodiment is the same as that of the ninth embodiment. The liquid crystal display device according to the tenth embodiment has the same effect as the liquid crystal display device according to the second embodiment. Additionally, the liquid crystal display device according to the tenth embodiment has advantages in which because the columnar spacer facing portion has two inclined surfaces, displacement of the substrate around the columnar spacer facing portion becomes small and deviation of the residual stress can be suppressed.

Embodiment 11

Figure 17:
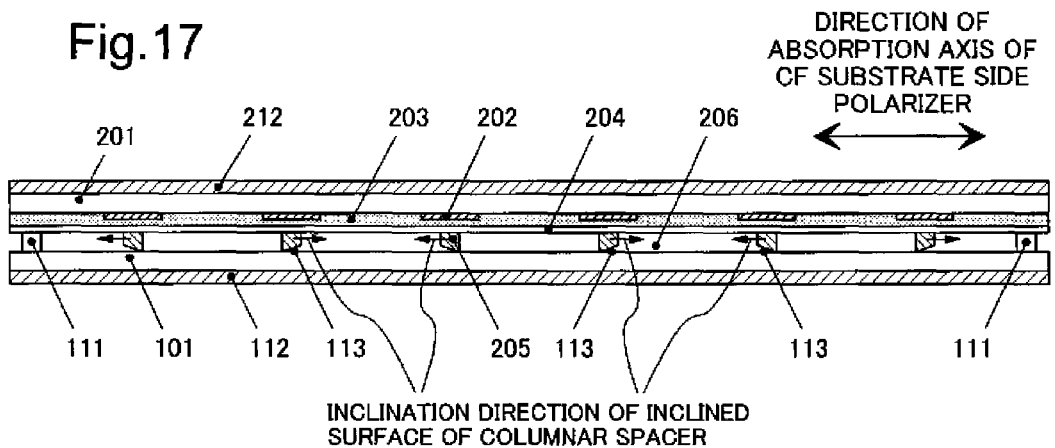
FIG. 17 is a sectional view showing a structure of a liquid crystal display panel according to an eleventh embodiment of the present invention.

Next, a liquid crystal display device according to an eleventh embodiment of the present invention will be described with reference to FIGS. 17 and 20B. FIG. 17 is a sectional view showing a structure of a liquid crystal display panel according to the eleventh embodiment of the present invention. FIG. 20B shows an inclination direction of the columnar spacer when viewed from a normal direction of a display surface. FIG. 17 shows a cross-sectional surface of the liquid crystal display panel according to the eleventh embodiment along a line A-A' whose direction is the same as that of the second embodiment. The direction along the line A-A' is the direction of the absorption axis of the polarizer of the CF substrate side.

As shown in FIGS. 17 and 20B, in the eleventh embodiment, the two types of columnar spacer 205 having different inclined surfaces that are inclined in opposing directions are arranged alternately in the direction of the absorption axial of the polarizer of the CF substrate side. This arrangement of the columnar spacer 205 is different from that of the second embodiment shown in FIG. 20A. A structure of the liquid crystal display panel according to the eleventh embodiment is the same as that of the second embodiment except the arrangement of the columnar spacer. Further, the structure of the columnar spacer 205 shown in one of the third, the fourth, the eighth, and the ninth embodiments may be applied to this embodiment.

The liquid crystal display device according to the eleventh embodiment has the same effect as the liquid crystal display device according to the second embodiment. Additionally, the liquid crystal display device according to the eleventh embodiment has advantages in which because the direction of the residual stress generated in the substrate can be controlled with the arrangement of the columnar spacer, a position at which the light leakage is generated by the retardation of a glass can be controlled.

Embodiment 12

Figure 18:
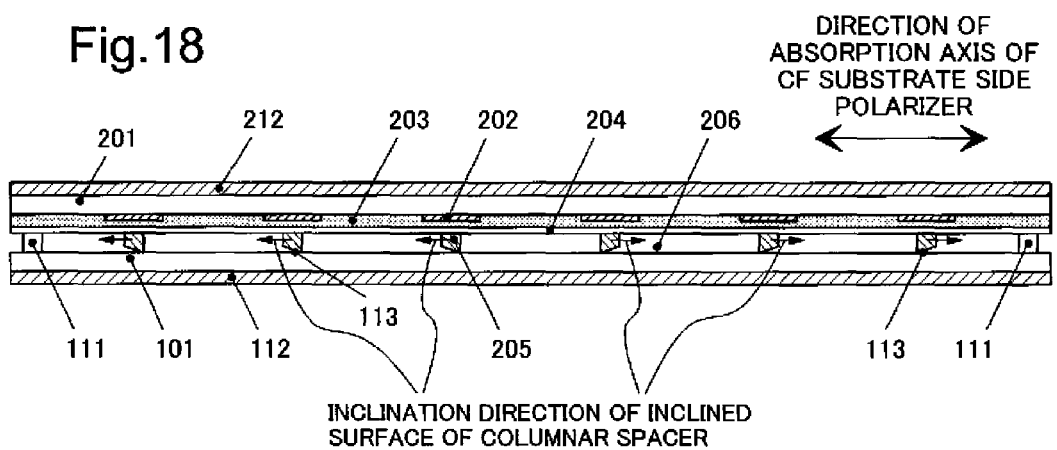
FIG. 18 is a sectional view showing a structure of a liquid crystal display panel according to a twelfth embodiment of the present invention.

Next, a liquid crystal display device according to a twelfth embodiment of the present invention will be described with reference to FIGS. 18 and 20C. FIG. 18 is a sectional view showing a structure of a liquid crystal display panel according to the twelfth embodiment of the present invention. FIG. 20C shows an inclination direction of the columnar spacer when viewed from a normal direction of a display surface. FIG. 18 shows a cross-sectional surface of the liquid crystal display panel according to the twelfth embodiment along a line A-A' whose direction is the same as that of the second embodiment. The direction along the line A-A' is the direction of the absorption axis of the polarizer of the CF substrate side.

As shown in FIGS. 18 and 20C, in the twelfth embodiment, the two types of columnar spacer 205 having different inclined surfaces that are inclined in opposing directions are used and the columnar spacers 205 are arranged so that the inclined surface of the columnar spacer faces the outside of the panel in each of two areas separated by a center line of the panel. This arrangement of the columnar spacer 205 is different from that of the second embodiment. A structure of the liquid crystal display panel according to the twelfth embodiment is the same as that of the second embodiment except the arrangement of the columnar spacer. Further, the structure of the columnar spacer 205 shown in one of the third, the fourth, the eighth, and the ninth embodiments may be applied to this embodiment.

The liquid crystal display device according to the twelfth embodiment has the same effect as the liquid crystal display device according to the second embodiment. Additionally, the liquid crystal display device according to the twelfth embodiment has advantages in which the residual stress caused by relatively large displacement of the substrate can be efficiently dispersed by arranging the direction of the residual stress in the same direction.

Embodiment 13

Figure 19:
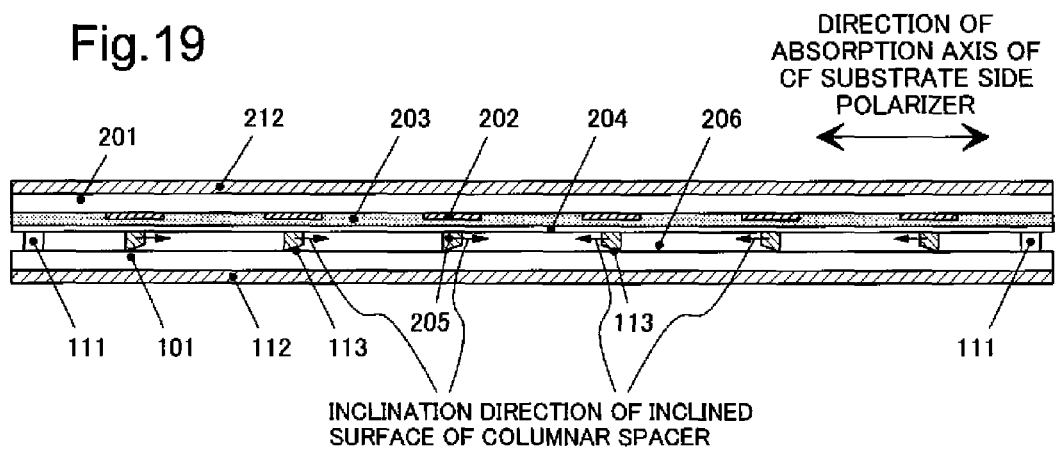
FIG. 19 is a sectional view showing a structure of a liquid crystal display panel according to a thirteenth embodiment of the present invention.

Next, a liquid crystal display device according to the thirteenth embodiment of the present invention will be described with reference to FIGS. 19 and 20D. FIG. 19 is a sectional view showing a structure of a liquid crystal display panel according to the thirteenth embodiment of the present invention. FIG. 20D shows an inclination direction of the columnar spacer when viewed from a normal direction of a display surface. FIG. 19 shows a cross-sectional surface of the liquid crystal display panel according to the thirteenth embodiment along a line A-A' whose direction is the same as that of the second embodiment. The direction along the line A-A' is the direction of the absorption axis of the polarizer of the CF substrate side.

As shown in FIGS. 19 and 20D, in the thirteenth embodiment, the two types of columnar spacer 205 having different inclined surfaces that are inclined in opposing directions are used and the columnar spacers 205 are arranged so that the inclined surface of the columnar spacer faces the center line of the panel in each of two areas separated by a center line of the panel. This arrangement of the columnar spacer 205 is different from that of the second embodiment. A structure of the liquid crystal display panel according to the thirteenth embodiment is the same as that of the second embodiment except the arrangement of the columnar spacer. Further, the structure of the columnar spacer 205 shown in one of the third, the fourth, the eighth, and the ninth embodiments may be applied to this embodiment.

The liquid crystal display device according to the thirteenth embodiment has the same effect as the liquid crystal display device according to the second embodiment. Additionally, the liquid crystal display device according to the thirteenth embodiment has advantages in which the residual stress caused by relatively large displacement of the substrate can be efficiently dispersed by arranging the direction of the residual stress in the same direction.

Embodiment 14

Next, a liquid crystal display device according to the fourteenth embodiment of the present invention will be described with reference to FIGS. 21A to 21D. FIGS. 21A to 21D show an inclination direction of the columnar spacer in a liquid crystal display panel according to the fourteenth embodiment of the present invention.

As shown in FIGS. 21A to 21D, in this embodiment, the columnar spacer 205 is arranged so that the direction of the inclined surface of the columnar spacer 205 is perpendicular to the direction of the absorption axis of the polarizer of the CF substrate side.

Figure 21A:
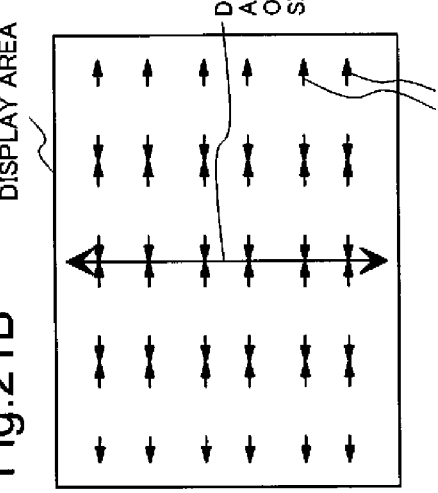
FIGS. 21A to 21D show an inclination direction of a columnar spacer in a liquid crystal display panel according to a fourteenth embodiment.

In an embodiment shown in FIG. 21A, the columnar spacer 205 is arranged so that the directions of the inclined surfaces of the columnar spacers are arranged in the same direction (right direction in FIG. 21A).

Figure 21B:
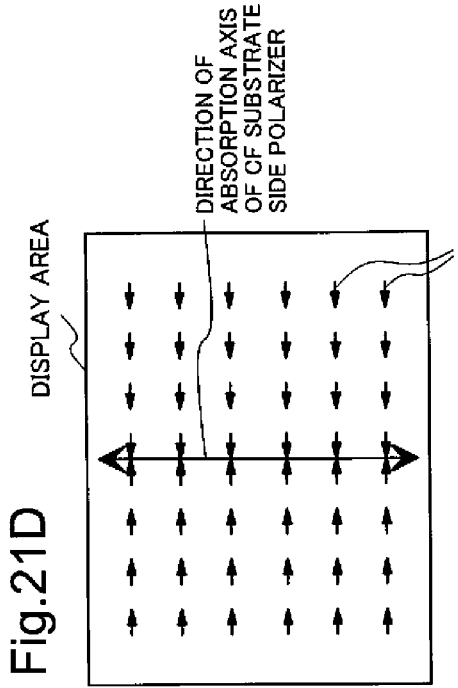
Figure 21C:
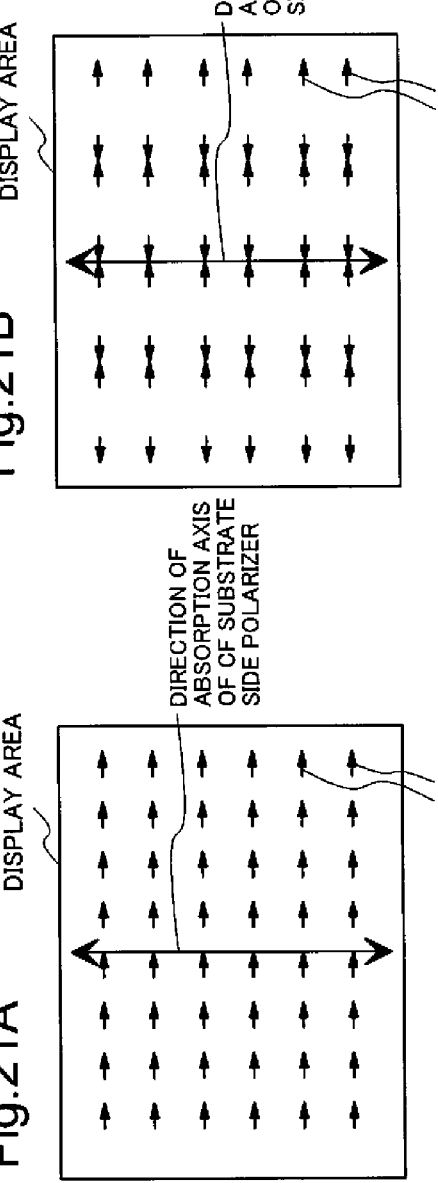
Figure 21D:
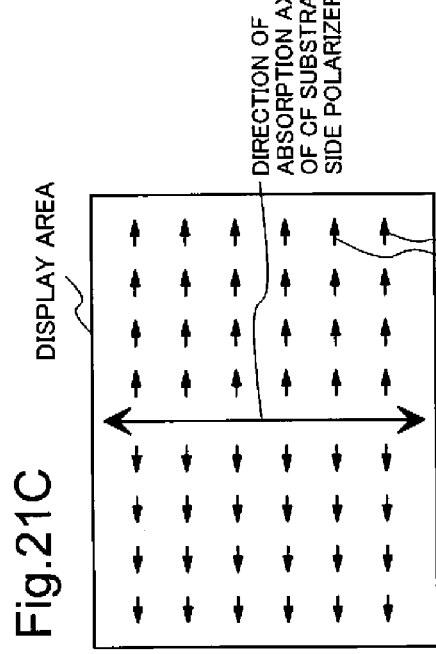
Figure 22A:
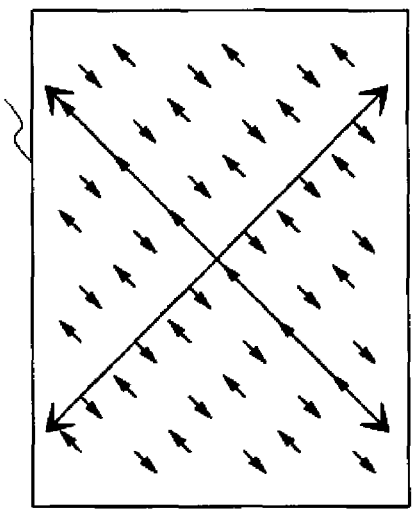
FIGS. 22A to 22D show an inclination direction of a columnar spacer in a liquid crystal display panel according to a fifteenth embodiment.
Figure 22B:
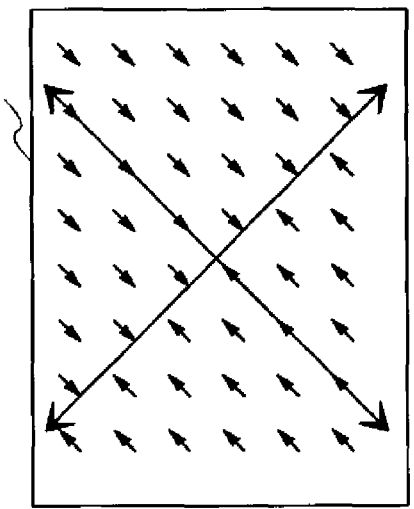
Figure 22C:
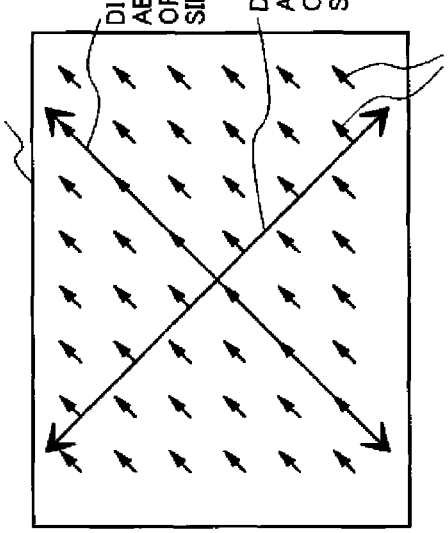
Figure 22D:
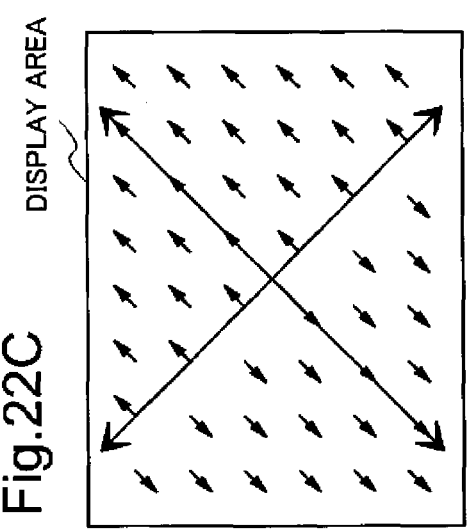
Figure 23A:
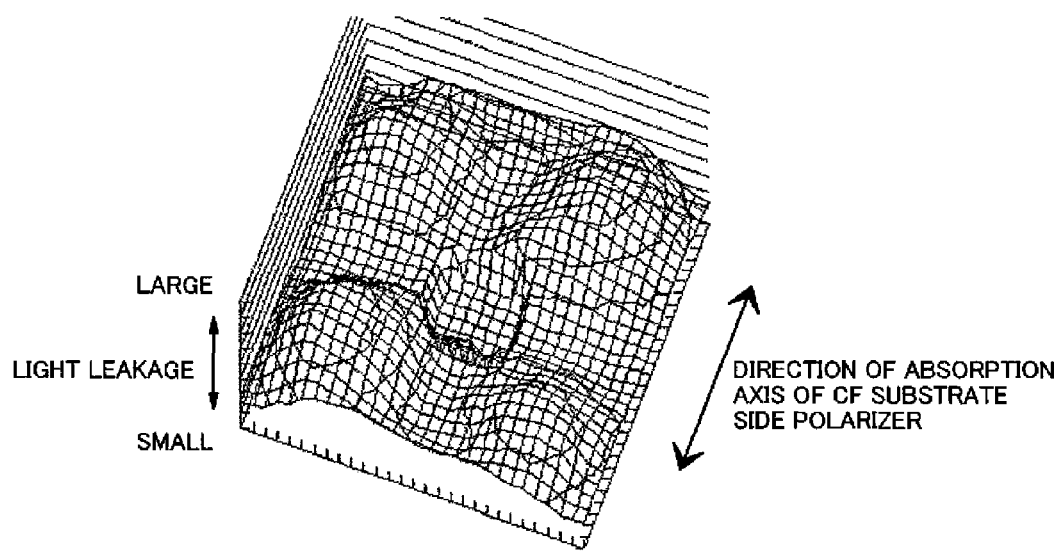
FIGS. 23A and 23B show an actually measured value of a light leakage distribution and a predicted value of the light leakage distribution, respectively.
Figure 23B:
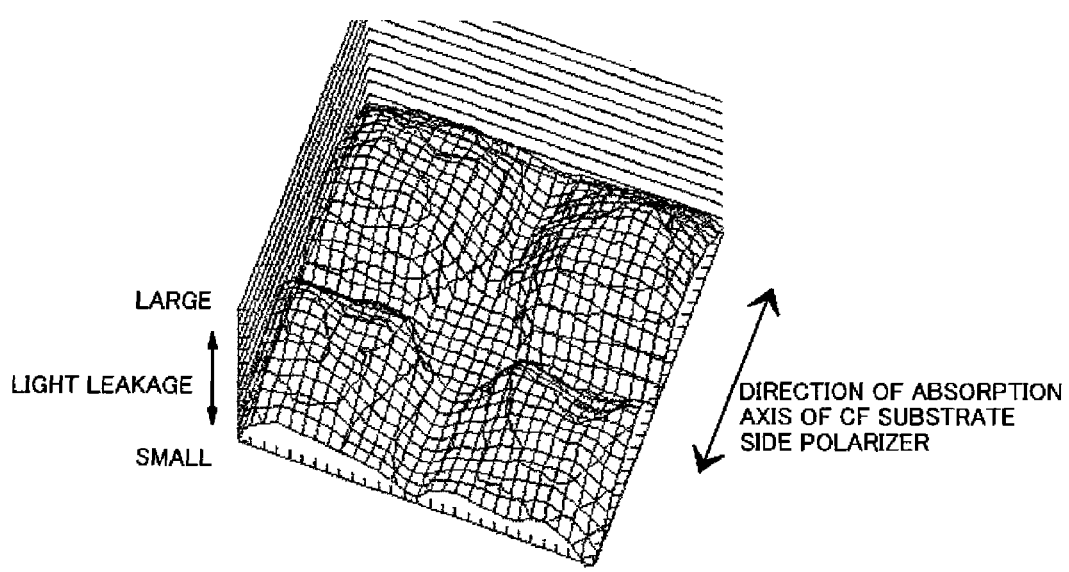

FIGS. 21B to 21D show the arrangement of the two types of columnar spacer 205 having different inclined surfaces that are inclined in opposing directions. In the embodiment shown in FIG. 21B, the two types of columnar spacer 205 having different inclined surfaces that are inclined in opposing directions are alternately arranged in the direction perpendicular to the direction of the absorption axis of the polarizer of the CF substrate side. In the embodiment shown in FIG. 21C, the two types of columnar spacer 205 having different inclined surfaces that are inclined in opposing directions are arranged so that the inclined surface of the columnar spacer faces the outside of the panel in each of two areas separated by a center line of the panel. In the embodiment shown in FIG. 21D, the two types of columnar spacer 205 having different inclined surfaces that are inclined in opposing directions are arranged so that the inclined surface of the columnar spacer faces the center line of the panel in each of two areas separated by a center line of the panel.

Even when the inclination direction of the columnar spacer is perpendicular to the direction of the absorption axis of the polarizer of the CF substrate side when viewed from a normal direction of a display surface, the same effect as a case in which the inclination direction of the columnar spacer is parallel to the direction of the absorption axis of the polarizer of the CF substrate side can be obtained.

The liquid crystal display device according to the fourteenth embodiment has the same effect as the liquid crystal display device according to the second, the eleventh, the twelfth or the thirteenth embodiment. Additionally, the liquid crystal display device according to the fourteenth embodiment has advantages in which because the direction of the residual stress generated in the substrate is different by 90 degrees from the direction in a case of the second, the eleventh, the twelfth or the thirteenth embodiment, degree of freedom in design of the display panel is improved.

Embodiment 15

Next, a liquid crystal display device according to a fifteenth embodiment of the present invention will be described with reference to FIGS. 22A to 22D. FIGS. 22A to 22D show the inclination direction of the columnar spacer in a liquid crystal display panel according to the fifteenth embodiment of the present invention.

The liquid crystal display device according to the fifteenth embodiment is a liquid crystal display device employing a TN (Twisted Nematic) method. In the TN method used in this embodiment, as shown in FIGS. 22A to 22D, the inclination direction of the columnar spacer is the direction perpendicular to the direction of the absorption axis of the polarizer of the CF substrate side when viewed from a normal direction of the display surface. The arrangement of the columnar spacer in this embodiment is the same as that of the fourteenth embodiment except a rotation operation by 45 degrees with respect to a normal direction of the display surface.

The liquid crystal display device according to the fifteenth embodiment has the same effect as the liquid crystal display device according to the second embodiment.

When the direction of the absorption axis of the polarizer of the TFT substrate side and the direction of the absorption axis of the polarizer of the CF substrate side are exchanged with each other, this embodiment is the same as the second, the eleventh, the twelfth or the thirteenth embodiment except the rotation operation by 45 degrees with respect to a normal direction of the display surface. Additionally, the liquid crystal display device according to the fifteenth embodiment has advantages in which because the direction of the residual stress generated in the substrate is different by 90 degrees from the direction in a case of the second, the eleventh, the twelfth or the thirteenth embodiment, degree of freedom in design of the display panel is improved.

Japanese Patent Application Laid-Open No. 2001-117103 discloses a manufacturing method with which a frictional force is controlled by restricting a contact area of the columnar spacer. Although the residual stress generated in a glass is suppressed within the predetermined range, it is difficult to completely eliminate the influence of the frictional force. Therefore, the sufficient effect cannot be obtained for the light leakage in the black-color display screen caused by the retardation of the glass. Furthermore, the method has no effect on the retardation generated by the distortion or the like when a panel is pushed by a chassis.

Japanese Patent Application Laid-Open No. 2005-242297 discloses a manufacturing method with which the residual stress inside the glass is reduced with a reduction in the frictional force and the light leakage caused by the retardation of the glass is suppressed. However, it is difficult to completely eliminate the influence of the frictional force. The sufficient effect cannot be obtained for the light leakage. Furthermore, the method has no effect on the retardation generated by the distortion or the like when a panel is pushed by a chassis.

In a liquid crystal display element disclosed by Japanese Patent Application Laid-Open No. 2000-267111, the residual stress inside the glass is not reduced and the direction of the stress is not controlled. Accordingly, an effect on which the light leakage in the black-color display screen is suppressed cannot be obtained. Furthermore, the liquid crystal display element has a problem such as the light leakage in an oblique viewing direction caused by a positional shift of the bonded substrate due to temperature variation, color unevenness caused by cell gap variation due to temperature variation, or the like.

In the liquid crystal display device of the present invention, the columnar spacer fixed on one substrate side is used. However, the light leakage defect caused by the retardation of a transparent substrate is hardly produced. Additionally, brightness unevenness in the black-color display screen is reduced and the light leakage defect when a panel is pushed by a chassis is reduced. By these effects, a contrast of a displayed image is improved.

Further, the present invention has a feature in which all driving methods can be used for the liquid crystal panel of the present invention. Namely, the present invention can be applied to the liquid crystal panel which uses the driving method, for example, the IPS method, the TN (Twisted Nematic) method, the VA (Vertical Alignment) method, the FFS (Fringe Field Switching) method, or the like. The present invention is characterized in that the inclination direction of the top of the columnar spacer is almost parallel to or perpendicular to the direction of the absorption axis of the polarizer of the display surface side. Therefore, the same effect can be obtained for all the liquid crystal panels that use the above-mentioned driving methods.

The present invention can be applied to a liquid crystal display device in which the cell gap between a pair of substrates is determined with the columnar spacer formed on one of the substrates.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A display device, comprising:
a substrate, including a columnar spacer on an inner surface and a first polarizer on an outer surface; and
a counter substrate bonded to said substrate, including a columnar spacer facing portion on an inner surface and a second polarizer on an outer surface, wherein
a top portion of said columnar spacer or said columnar spacer facing portion has an inclined surface, and
an inclination direction of said inclined surface is parallel to or perpendicular to a direction of an absorption axis of said first polarizer, or said inclination direction of said inclined surface is parallel to or perpendicular to a direction of an absorption axis of said second polarizer, as viewed from a normal direction to a display surface of said substrate.

2. The display device according to claim 1, wherein
said direction of the absorption axis of said first polarizer is perpendicular to said direction of the absorption axis of said second polarizer.

3. The display device according to claim 1, wherein
said inclined surface is formed in a stepped shape.

4. The display device according to claim 1, wherein
said inclined surface is curved.

5. The display device according to claim 1, wherein
at least one of the top portion of said columnar spacer and said columnar spacer facing portion has a first inclined surface and a second inclined surface within each unit of site where said columnar spacer connects to touch/abut upon said columnar spacer facing portion; and
an inclination direction of said second inclined surface is opposite to an inclination direction of said first inclined surface.

6. The display device according to claim 1, wherein
at least one of said top portion of said columnar spacer and said columnar spacer facing portion is composed of a combination of two or more kinds, wherein inclination directions of inclined surfaces of said two or more kinds, where said columnar spacer connects to touch/abut upon said columnar spacer facing portion, are different by 180 degrees.

7. The display device according to claim 6, wherein
at least one of said top portion of said columnar spacer and said columnar spacer facing portion is composed of a combination in which an inclination direction of an inclined surface, where said columnar spacer connects to touch/abut upon said columnar spacer facing portion, is different by 180 degrees at every single site periodically.

8. The display device according to claim 6, wherein
at least one of said top portion of said columnar spacer and said columnar spacer facing portion is composed of a line-symmetric combination in which inclination directions of inclined surfaces, where said columnar spacer connects to touch/abut upon said columnar spacer facing portion, are different by 180 degrees between two areas on two sides of a line of a central of a central part of said display surface.

9. A method for manufacturing a substrate, which is bonded to a counter substrate, while sandwiching a liquid crystal between the substrate and the counter substrate, comprising:
forming a columnar spacer on an inner surface of said substrate;
forming a first polarizer on an outer surface of said substrate;
forming a columnar facing portion on an inner surface of said counter substrate; and
forming a second polarizer on an outer surface of said counter substrate, wherein
a top portion of said columnar spacer or said columnar facing portion has all inclined surface, and
an inclination direction of said inclined surface is parallel to or perpendicular to a direction of an absorption axis of said first polarizer, or said inclination direction of said inclined surface is parallel to or perpendicular to a direction of an absorption axis of said second polarizer.

* * * * *